US008657059B2

(12) United States Patent
Yamada et al.

(10) Patent No.: US 8,657,059 B2
(45) Date of Patent: Feb. 25, 2014

(54) ATTACHMENT STRUCTURE OF PROPELLER SHAFT TO CROSS-MEMBER

(75) Inventors: Hideto Yamada, Higashi-Hiroshima (JP); Hiroyuki Akaki, Higashi-Hiroshima (JP); Soukichi Kikuchi, Higashi-Hiroshima (JP)

(73) Assignees: Ford Global Technologies, LLC, Dearborn, MI (US); Mazda Motor Corporation, Hiroshima (JP)

( * ) Notice: Subject to any disclaimer, the term of this patent is extended or adjusted under 35 U.S.C. 154(b) by 0 days.

(21) Appl. No.: 13/636,562

(22) PCT Filed: Mar. 29, 2010

(86) PCT No.: PCT/JP2010/002280
§ 371 (c)(1),
(2), (4) Date: Sep. 21, 2012

(87) PCT Pub. No.: WO2011/121638
PCT Pub. Date: Oct. 6, 2011

(65) Prior Publication Data
US 2013/0011092 A1 Jan. 10, 2013

(51) Int. Cl.
*B62D 21/08* (2006.01)
*B60K 17/22* (2006.01)

(52) U.S. Cl.
USPC .............................. 180/312; 180/376; 220/562

(58) Field of Classification Search
USPC ................. 180/291, 311, 312, 379, 232, 376; 220/562
See application file for complete search history.

(56) References Cited

U.S. PATENT DOCUMENTS

| 2,773,304 | A | * | 12/1956 | Fageol | 29/469 |
| 5,562,179 | A | * | 10/1996 | McAdam | 180/379 |
| 7,364,002 | B2 | * | 4/2008 | Mabuchi et al. | 180/296 |
| 8,225,899 | B2 | * | 7/2012 | Mabuchi et al. | 180/296 |
| 2005/0061573 | A1 | * | 3/2005 | Mizuno et al. | 180/376 |
| 2005/0167968 | A1 | | 8/2005 | Mabuchi et al. | |
| 2013/0008735 | A1 | * | 1/2013 | Hiramatsu et al. | 180/291 |

FOREIGN PATENT DOCUMENTS

| JP | 59-069023 U | 5/1984 |
| JP | 03-112427 U | 11/1991 |
| JP | 2513857 Y2 | 7/1996 |
| JP | 08-197970 A | 8/1996 |
| JP | 2944198 B2 | 6/1999 |
| JP | 2005-212748 A | 8/2005 |
| JP | 2006-132628 A | 5/2006 |

OTHER PUBLICATIONS

International Search Report; PCT/JP2010/002280; Jun. 29, 2010.

* cited by examiner

*Primary Examiner* — Drew Brown
(74) *Attorney, Agent, or Firm* — Studebaker & Brackett PC

(57) ABSTRACT

An attachment structure of a propeller shaft to a cross-member in a vehicle includes a pair of main frames (10) extending in a vehicle length direction; the cross-member (15) connecting the main frames (10) together; the propeller shaft (37) arranged between the main frames (10) and including a front shaft (37a) and a rear shaft (37b) connected together through a joint (65); a center bearing (67) fixed to the cross-member (15) and configured to rotatably support the front shaft (37a); a fuel tank (83) arranged between the center bearing (67) and one of the main frames (10); and a flexible connection body (170) configured to connect the center bearing (67) and part of the cross-member (15) on a side opposite to the fuel tank (83) and having a length which is substantially non-extendable.

9 Claims, 30 Drawing Sheets

ATTACHMENT STRUCTURE OF PROPELLER SHAFT TO CROSS-MEMBER

TECHNICAL FIELD

The present invention belongs to a technical field relating to an attachment structure of a propeller shaft to a cross-member in a vehicle.

BACKGROUND ART

Conventionally, a ladder shaped chassis frame is provided in a small truck or a vehicle called a "sport-utility vehicle (SUV)" as described in, e.g., Patent Documents 1 and 2. The chassis frame is formed in the ladder shape by a pair of right and left main frames (also called "side frames") extending in a vehicle length direction (vehicle longitudinal direction) and a plurality of cross-members each connecting the main frames together. Each of the main frames includes a narrow part provided such that a distance between the narrow parts of the main frames is short; a wide part provided such that a distance between the wide parts of the main frames is longer than that between the narrow parts; and a widened part positioned between the narrow part and the wide part and provided such that a distance between the widened parts of the main frames is increased toward the rear.

Typically, in the foregoing vehicle, power of an engine arranged in an engine room positioned in a front part of the vehicle is transmitted to rear wheels through a transmission, a propeller shaft, and a rear differential gear unit (in the case of a 4WD vehicle, a power transfer unit is provided between the transmission and the propeller shaft). The propeller shaft includes a front shaft and a rear shaft connected together through a joint (e.g., a universal joint). The vicinity of a rear end of the front shaft is supported by a center bearing.

In addition, in the foregoing vehicle, a fuel tank configured to store fuel to be supplied to the engine is provided. Typically, the fuel tank is arranged on one side of the rear shaft of the propeller shaft in a vehicle width direction.

Upon a frontal collision of the vehicle, a front end part of the propeller shaft is, due to, e.g., backward movement of the engine, pushed toward the rear, and therefore the propeller shaft is bent at the position of the joint. In such a case, e.g., Patent Document 1 has proposed that a propeller shaft is guided so as to be bent in a predetermined direction in order to prevent a collision of the propeller shaft with the fuel tank. Specifically, a connection wire connects between the center bearing and a front part of the wide part of the main frame provided on a side opposite to the fuel tank relative to the center bearing.

CITATION LIST

Patent Document

PATENT DOCUMENT 1: Japanese Patent No. 2944198

SUMMARY OF THE INVENTION

Technical Problem

In order to increase the capacity of the fuel tank as much as possible, it is necessary that the fuel tank is extended further forward, and therefore the extension of the fuel tank is positioned at the side of the center bearing. In such a case, it is necessary that the function to guide the bending of the propeller shaft is further ensured.

However, in the configuration descried in Patent Document 1, there is a possibility that the function to guide the bending of the propeller shaft cannot be adequately fulfilled, and therefore the configuration described in Patent Document 1 is susceptible to improvement. That is, in the configuration described in Patent Document 1, the connection wire is connected to the front part of the wide part of the main frame, and there is a possibility that a connection part of the connection wire and the main frame is, upon an offset frontal collision (collision on a side where the connection wire is connected to the main frame) of the vehicle, pushed toward an inner side in the vehicle width direction by, e.g., a hub configured to hold a front wheel and is deformed toward the inner side in the vehicle width direction. Thus, the connection part of the connection wire and the main frame moves backward, and, as a result, the function to guide, by the connection wire, the bending of the propeller shaft may not be adequately fulfilled.

The present invention has been made in view of the foregoing, and it is an objective of the present invention to ensure, upon a frontal collision of a vehicle, a function to guide bending of a propeller shaft regardless of whether the collision is a full-wrap collision or an offset collision.

Solution to the Problem

In order to accomplish the foregoing objective, the present invention is intended for an attachment structure of a propeller shaft to a cross-member in a vehicle. The structure includes a pair of main frames extending in a vehicle length direction; the cross-member connecting the main frames together; the propeller shaft arranged between the main frames and including a front shaft and a rear shaft connected together through a joint; a center bearing fixed to the cross-member and configured to rotatably support the front shaft; a fuel tank arranged between the center bearing and one of the main frames; and a flexible connection body configured to connect the center bearing and part of the cross-member on a side opposite to the fuel tank and having a length which is substantially non-extendable.

According to the foregoing configuration, even if the center bearing is detached from the cross-member upon a frontal collision of the vehicle, the center bearing and the part of the cross-member on the side opposite to the fuel tank are connected together through the connection body, and therefore the center bearing cannot move toward the fuel tank. One side of the connection body connected to the center bearing on the other side is connected to the cross-member to which the center bearing is attached. When the center bearing attached to the cross-member receives impact force from a front side of the vehicle and then is detached, great impact force does not act on the cross-member. A connection position of the main frame and the cross-member is spaced a large distance behind a position where, e.g., a hub configured to hold a front wheel is collided upon an offset frontal collision of the vehicle. As a result, the cross-member is hardly deformed upon the frontal collision of the vehicle, and a connection part of the connection body and the cross-member does not move. Thus, a function to guide bending of the propeller shaft by the connection body is further ensured. Consequently, the center bearing detached from the cross-member, part of the propeller shaft near the center bearing, and the joint can be prevented from moving toward the fuel tank.

It is preferred for the structure that the fuel tank is fixed to the cross-member.

According to the foregoing, since the fuel tank and one side of the connection body connected to the center bearing on the other side are fixed to the same cross-member which is less likely to be deformed upon the frontal collision of the vehicle as described above, a relative position relationship between the fuel tank and the connection part of the connection body and the cross-member is nearly unchanged upon the frontal collision of the vehicle. Thus, the center bearing detached from the cross-member, the part of the propeller shaft near the center bearing, and the joint do not contact the fuel tank.

It is preferred for the structure that the center bearing includes an attachment part fixed to the cross-member, and the attachment part is in such a shape that the attachment part can approach the cross-member from a rear side of the vehicle and can reach a fixing position thereof.

That is, upon the frontal collision of the vehicle, a power plant including an engine, a transmission, etc. preferably moves backward. However, in the state in which the front shaft connected to part of the power plant on the rear side of the vehicle is attached to the cross-member through the center bearing, the propeller shaft blocks the backward movement of the power plant. Thus, if the attachment part of the center bearing is in such a shape that the attachment part can approach the cross-member from the rear side of the vehicle and can reach the fixing position thereof, the center bearing moves backward by receiving impact force from the front shaft upon the backward movement of the power plant, and is easily detached from the cross-member. As a result, the propeller shaft is, together with the center bearing, detached from the cross-member, and therefore is less likely to block the backward movement of the power plant.

In the structure, the propeller shaft may be, as viewed in plane, bent at the joint such that the join is positioned on a side closer to the fuel tank relative to a straight line connecting front and rear ends of the propeller shaft.

That is, upon the frontal collision of the vehicle, if the function to guide the bending of the propeller shaft by the connection body cannot adequately fulfilled, there is a possibility that a change in degree of bending of the propeller shaft from an initial degree of bending is large. However, in the present invention, the function to guide the bending of the propeller shaft by the connection body is ensured, and features and advantages of the present invention can be effectively realized.

It is preferred for the structure that the center bearing is attached to the cross-member so as to be detached from the cross-member by backward movement of the center bearing due to impact force received from the front shaft, and the connection body is set to have a length at which the center bearing detached from the cross-member is unable to reach the fuel tank.

It can be ensured that contact between the center bearing detached from the cross-member and the fuel tank is prevented.

It is preferred for the structure that the connection body connects the center bearing and the cross-member in a state in which the connection body is loosened to allow the backward movement of the center bearing.

According to the foregoing, the center bearing can move backward by the amount of loosening of the connection body, and can be detached from the cross-member. In addition, the center bearing detached from the cross-member can be prevented from contacting the fuel tank.

It is preferred for the structure that the propeller shaft has, at a position thereof on a rear side relative to the center bearing, a collapse structure in which the propeller shaft is compressed in an axial direction of the rear shaft.

According to the foregoing, the front shaft can move backward by impact force received by the front shaft, and the center bearing is pushed toward the rear side of the vehicle by the backward movement of the front shaft. Thus, the center bearing can be easily detached from the cross-member.

It is preferred for the structure that, on a side opposite to the fuel tank relative to the center bearing, an exhaust pipe is provided so as to extend in the vehicle length direction, and a connection part of the cross-member and the connection body is positioned between the exhaust pipe and the center bearing.

According to the foregoing, the connection body does not necessarily cross over the exhaust pipe, and an operation of the connection body when the center bearing is detached from the cross-member can be stabilized.

It is preferred for the structure that the propeller shaft is arranged so as to pass below the cross-member, the center bearing is arranged on a front side relative to the cross-member, and the fuel tank includes a front extension extending toward the front side beyond the cross-member through below the cross-member and arranged next to the center bearing in a vehicle width direction.

According to the foregoing, the center bearing and the front extension of the fuel tank are arranged in the vehicle width direction. However, in the present invention, the connection body connecting the center bearing and the part of the cross-member on the side opposite to the fuel tank prevents the center bearing detached from the cross-member from contacting the front extension of the fuel tank. Thus, the capacity of the fuel tank can be increased. The propeller shaft passing below the cross-member is advantageous to detachment of the propeller shaft. In addition, when the propeller shaft is, together with the center bearing, detached from the cross-member, the center bearing is dropped, and the propeller shaft is, as viewed from the side of the vehicle, bent at the joint such that a joint part is positioned below the straight line connecting both ends of the propeller shaft. As a result, the propeller shaft is much less likely to block the backward movement of the power plant.

Advantages of the Invention

As described above, according to the structure of the present invention, the function to guide the bending of the propeller shaft is further ensured upon the frontal collision of the vehicle regardless of whether the collision is a full-wrap collision or an offset collision. The center bearing detached from the cross-member, the part of the propeller shaft near the center bearing, and the join can be prevented from moving toward the fuel tank.

DESCRIPTION OF EMBODIMENTS

An embodiment of the present invention will be described below in detail with reference to drawings.

Figure 1:
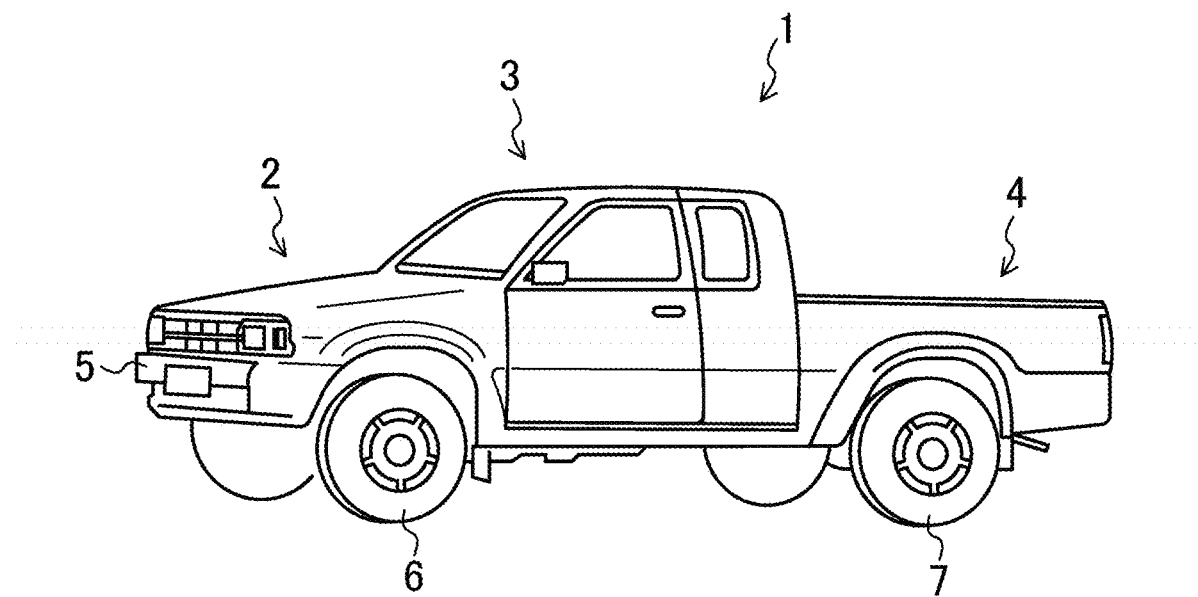
FIG. 1 is a perspective view illustrating the entirety of a vehicle for which a frontal collision energy absorption structure of an embodiment of the present invention is employed.
Figure 2:
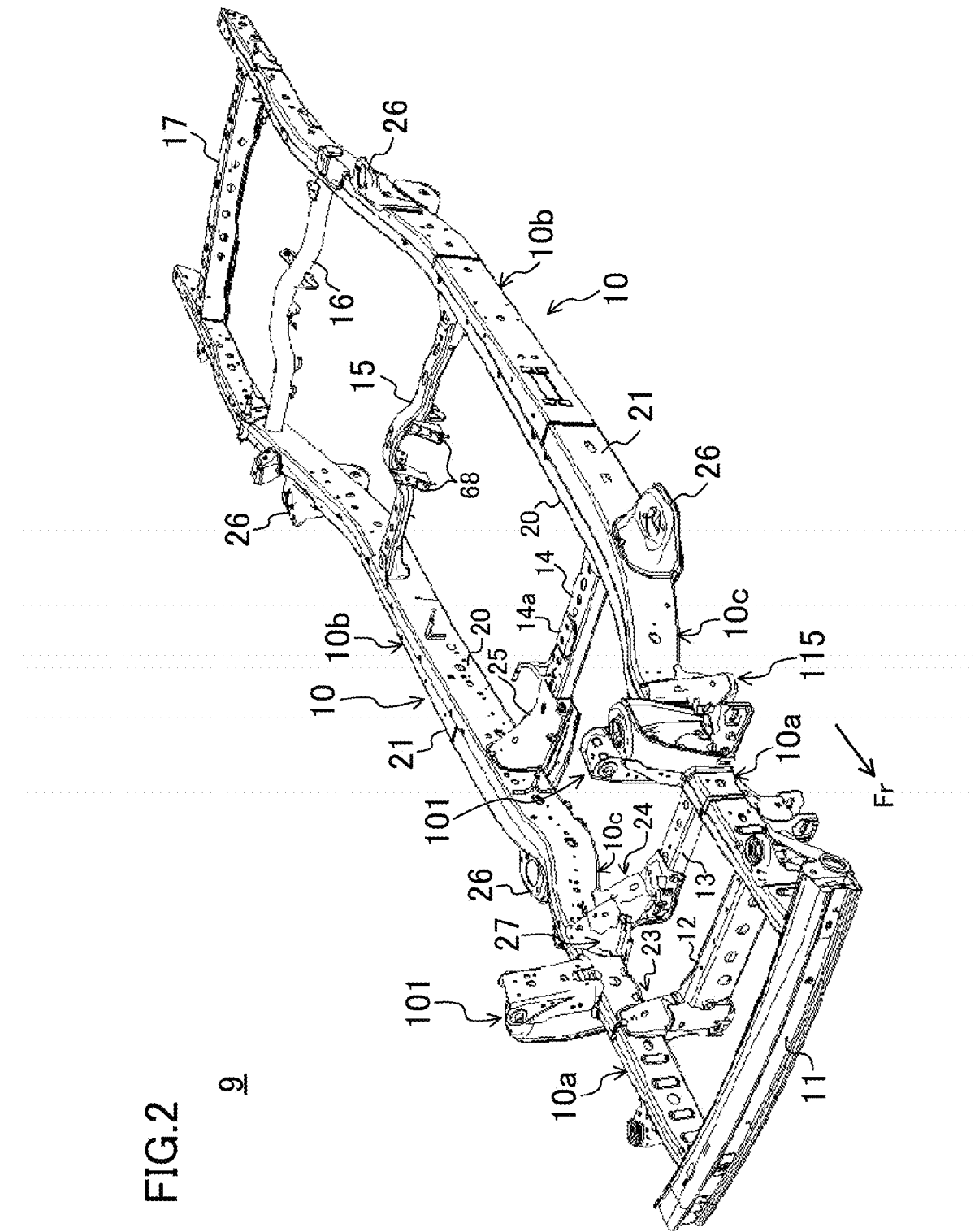
FIG. 2 is a perspective view of the entirety of a chassis frame of the vehicle diagonally from an upper left front side of the vehicle.
Figure 3:
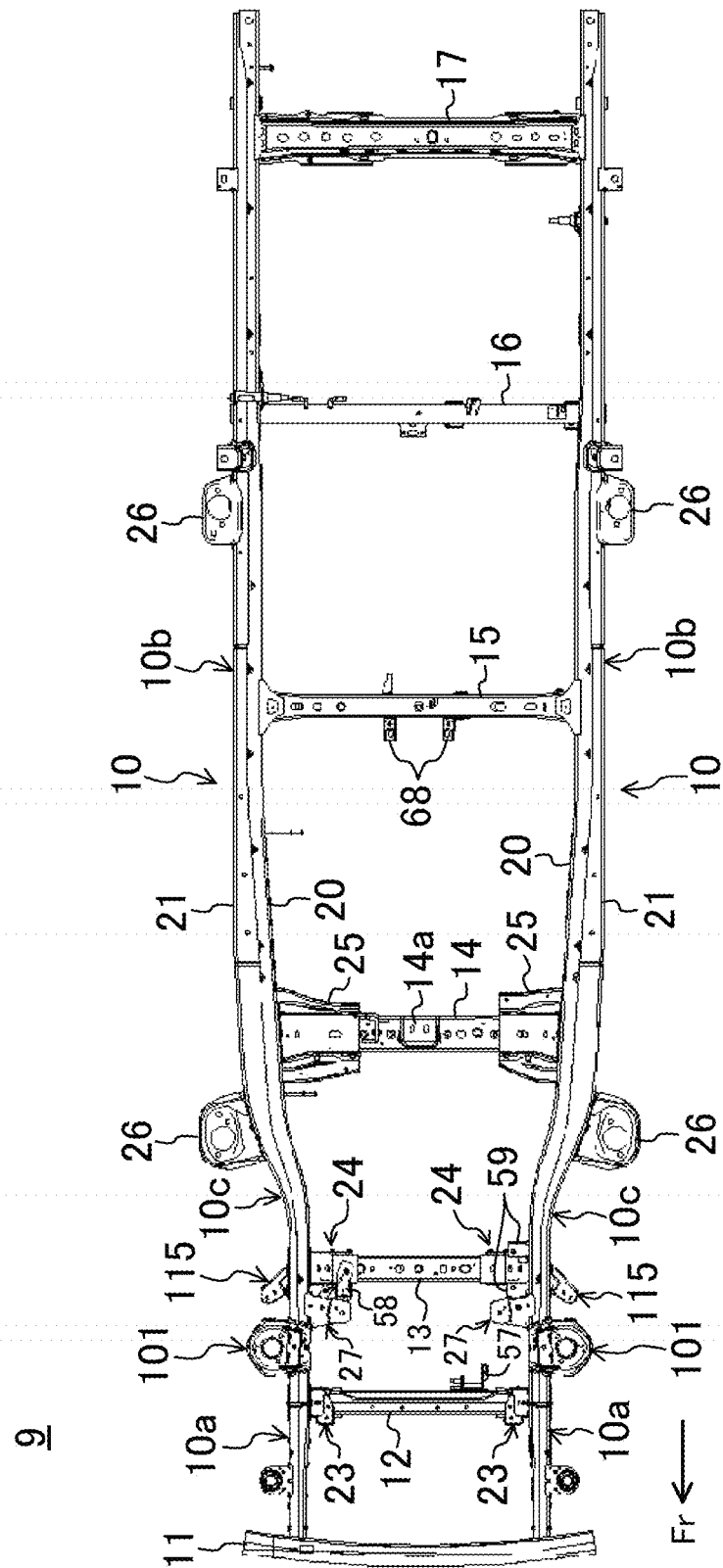
FIG. 3 is a plan view of the chassis frame.
Figure 4:
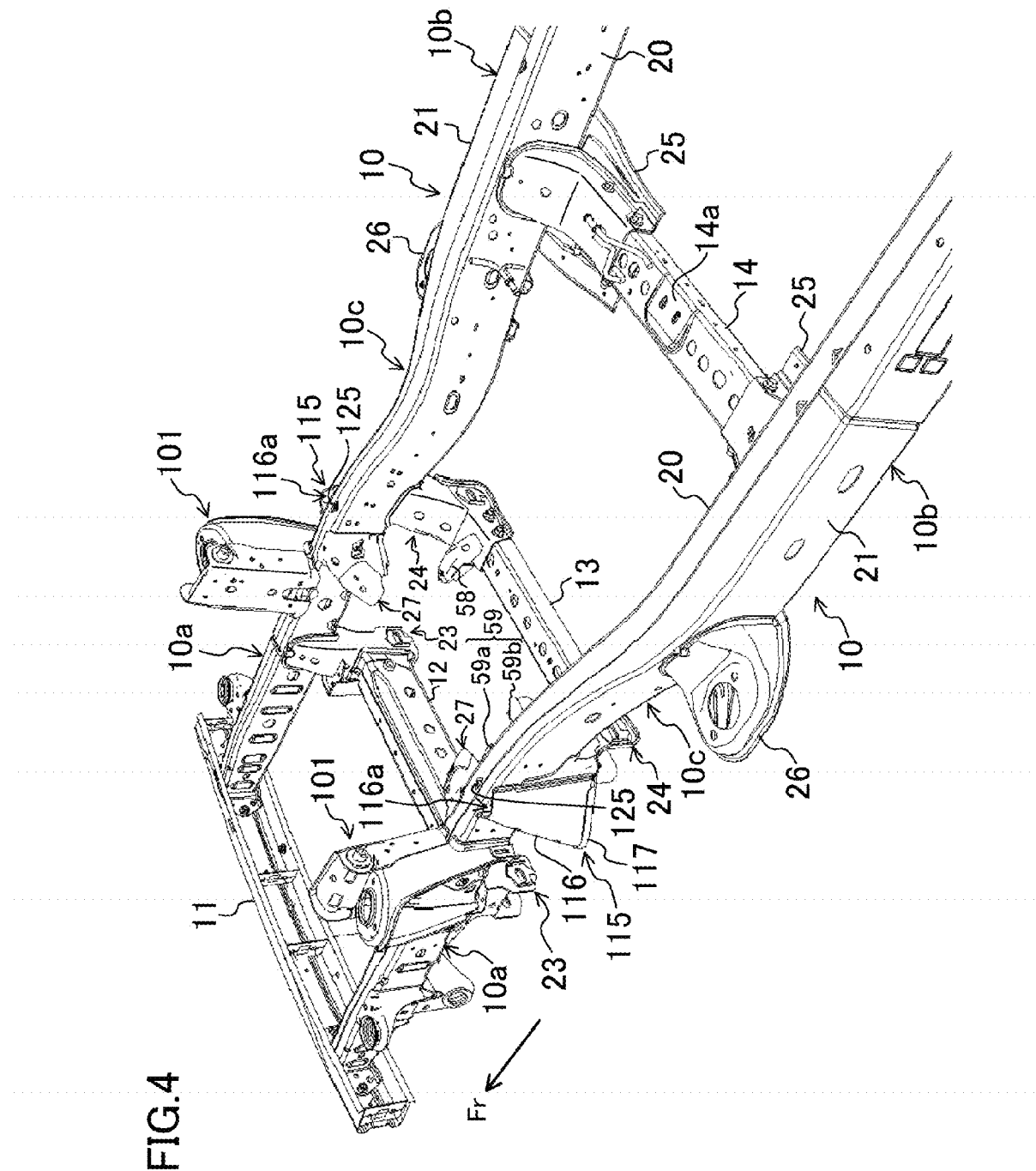
FIG. 4 is a perspective view of a front part of the chassis frame diagonally from an upper left rear side of the vehicle.
Figure 5:
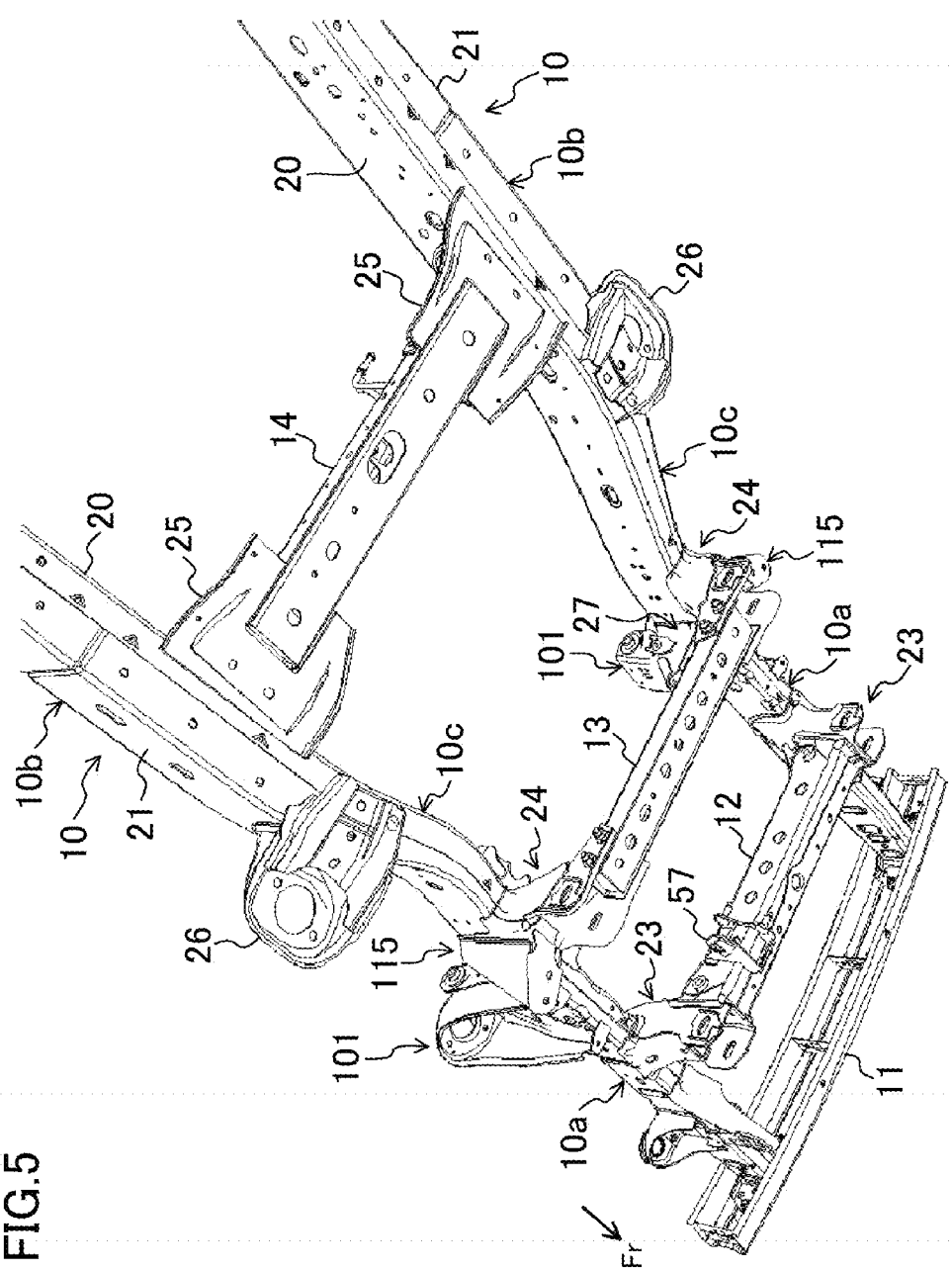
FIG. 5 is a perspective view of the front part of the chassis frame diagonally from a lower left rear side of the vehicle.
Figure 6:
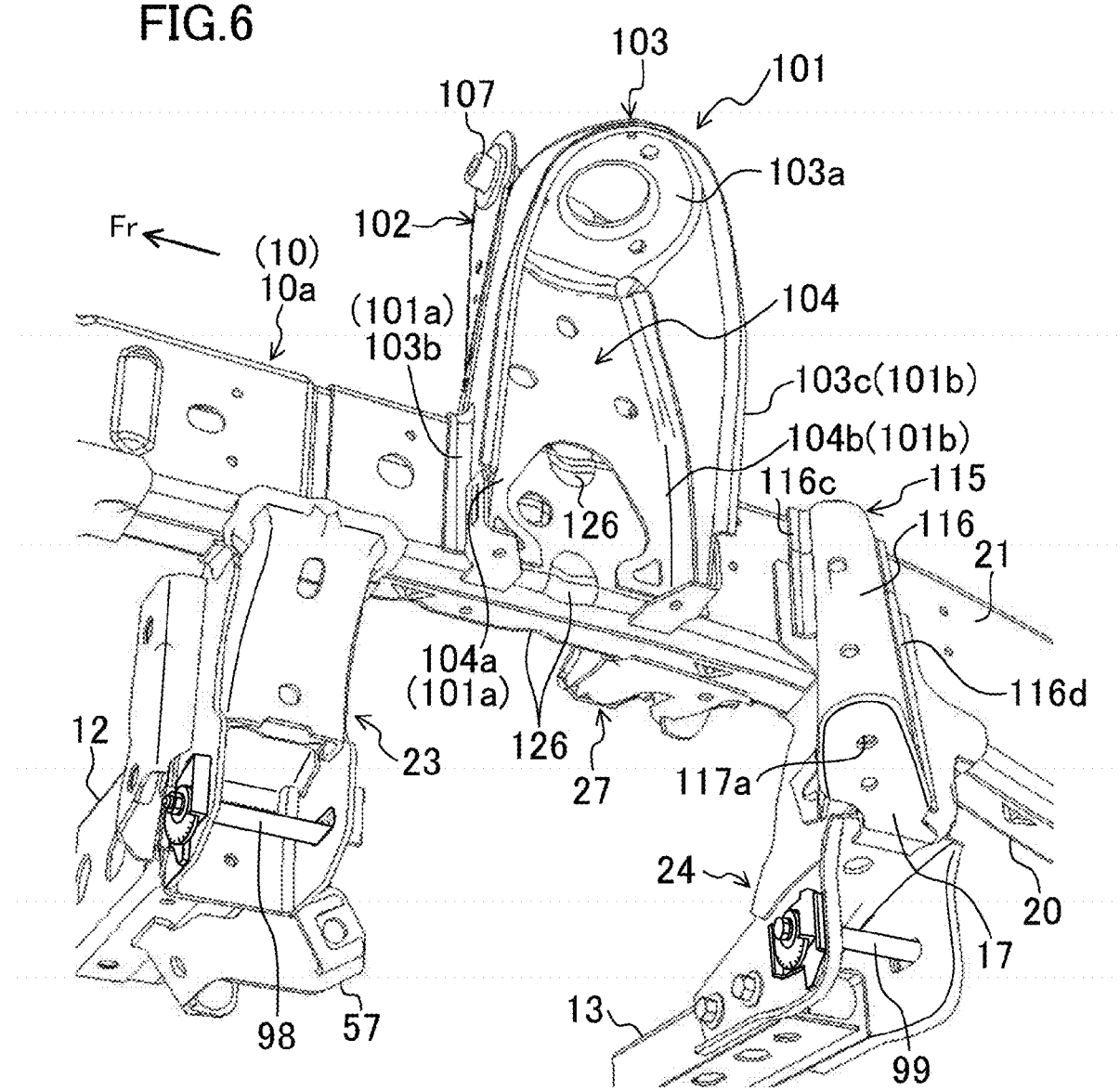
FIG. 6 is a perspective view illustrating the vicinity of a suspension tower in an outer part of a left main frame of the chassis frame in a vehicle width direction.
Figure 7:
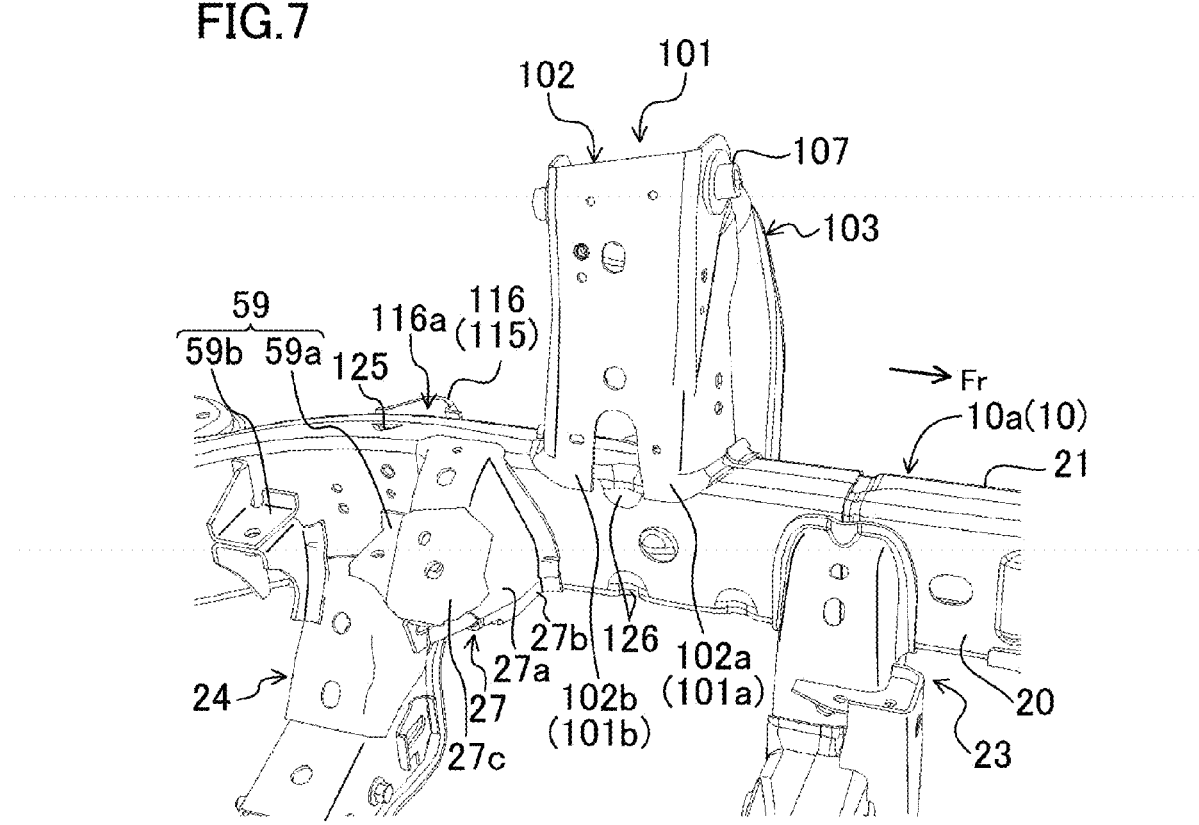
FIG. 7 is a perspective view illustrating the vicinity of the suspension tower in an inner part of the left main frame of the chassis frame in the vehicle width direction.
Figure 8:
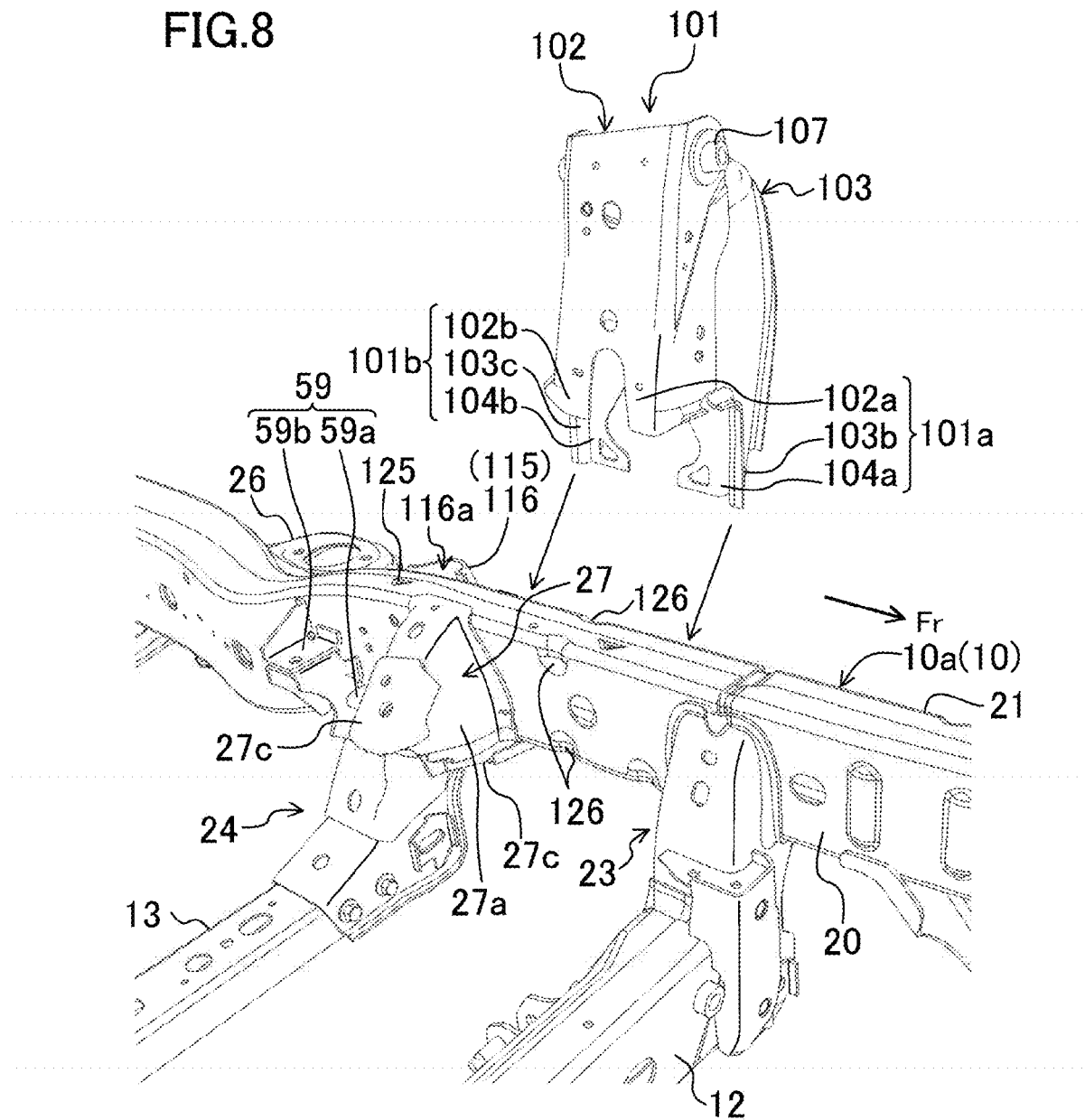
FIG. 8 is an exploded perspective view illustrating the vicinity of the suspension tower in the inner part of the left main frame of the chassis frame in the vehicle width direction.
Figure 9:
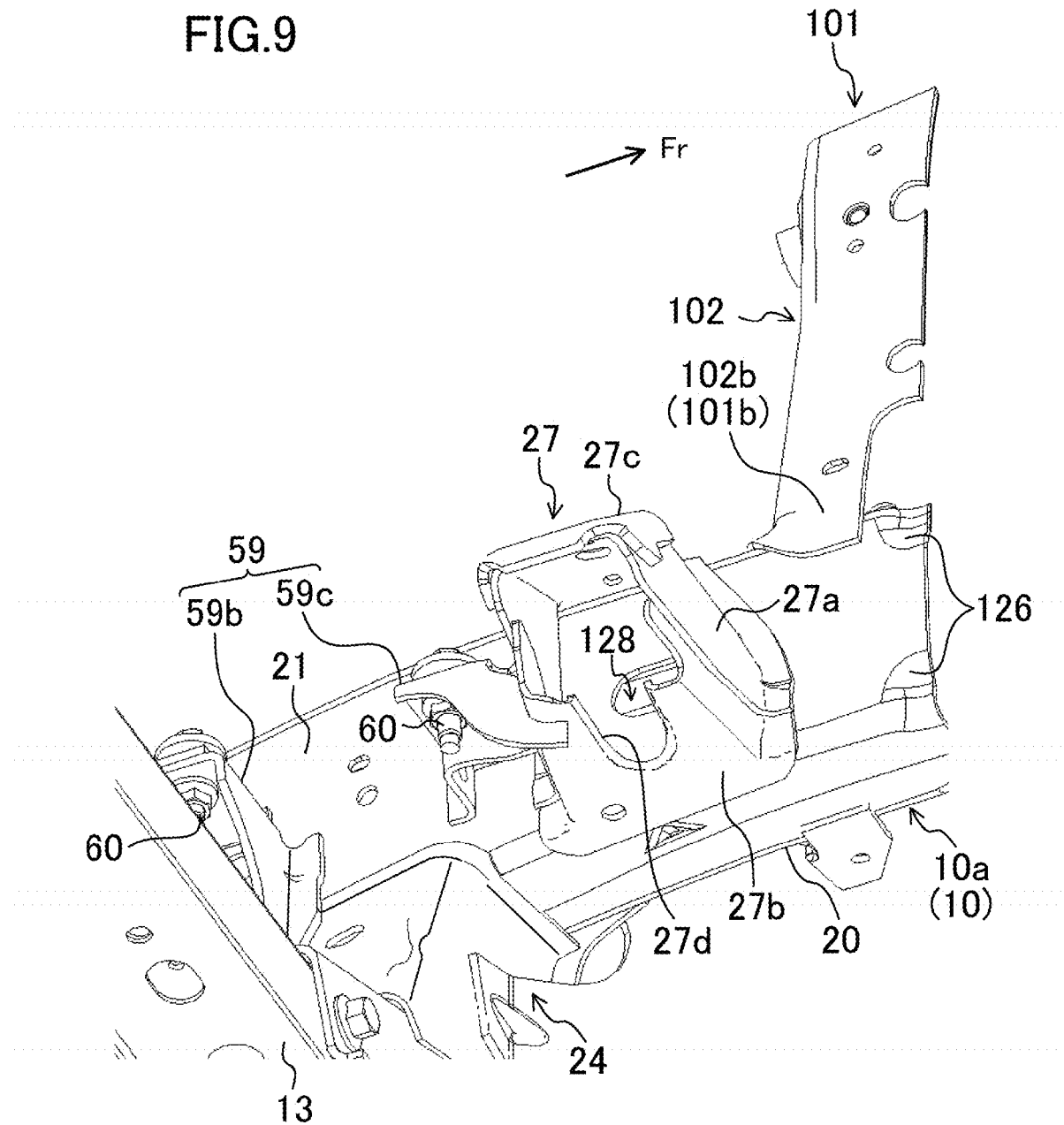
FIG. 9 is a perspective view illustrating the vicinity of an engine mount bracket in the inner part of the left main frame of the chassis frame in the vehicle width direction.

FIG. 1 illustrates the entirety of a vehicle 1 (in the present embodiment, a small truck) for which a frontal collision energy absorption structure of the embodiment of the present invention is employed. FIGS. 2-12 illustrate the entirety or part of a chassis frame 9 of the vehicle 1, and FIGS. 13-27 illustrate the state in which various components (including units) are mounted on the chassis frame 9.

Figure 13:
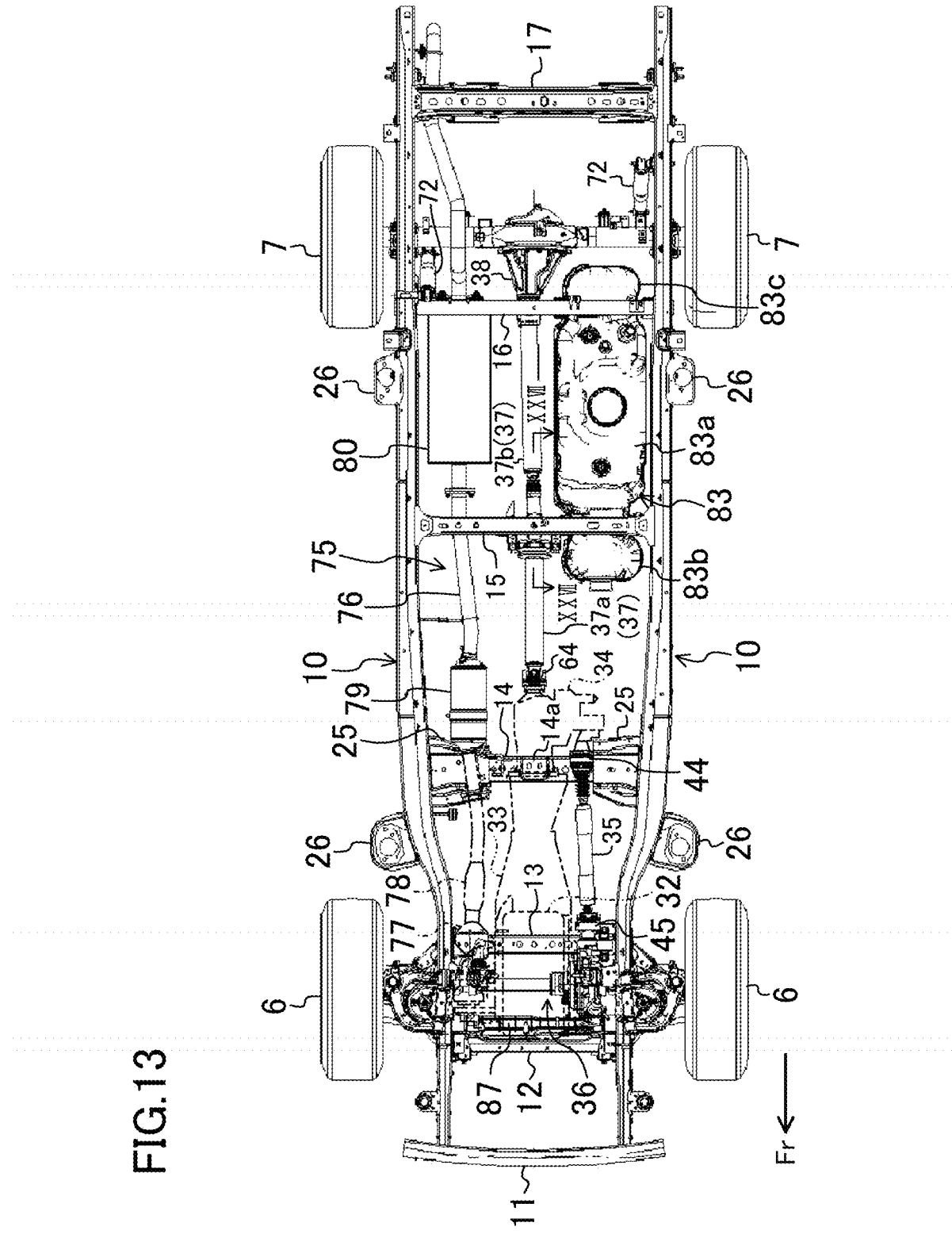
FIG. 13 is a plan view illustrating the state in which various components (including units) are mounted on the chassis frame.
Figure 14:
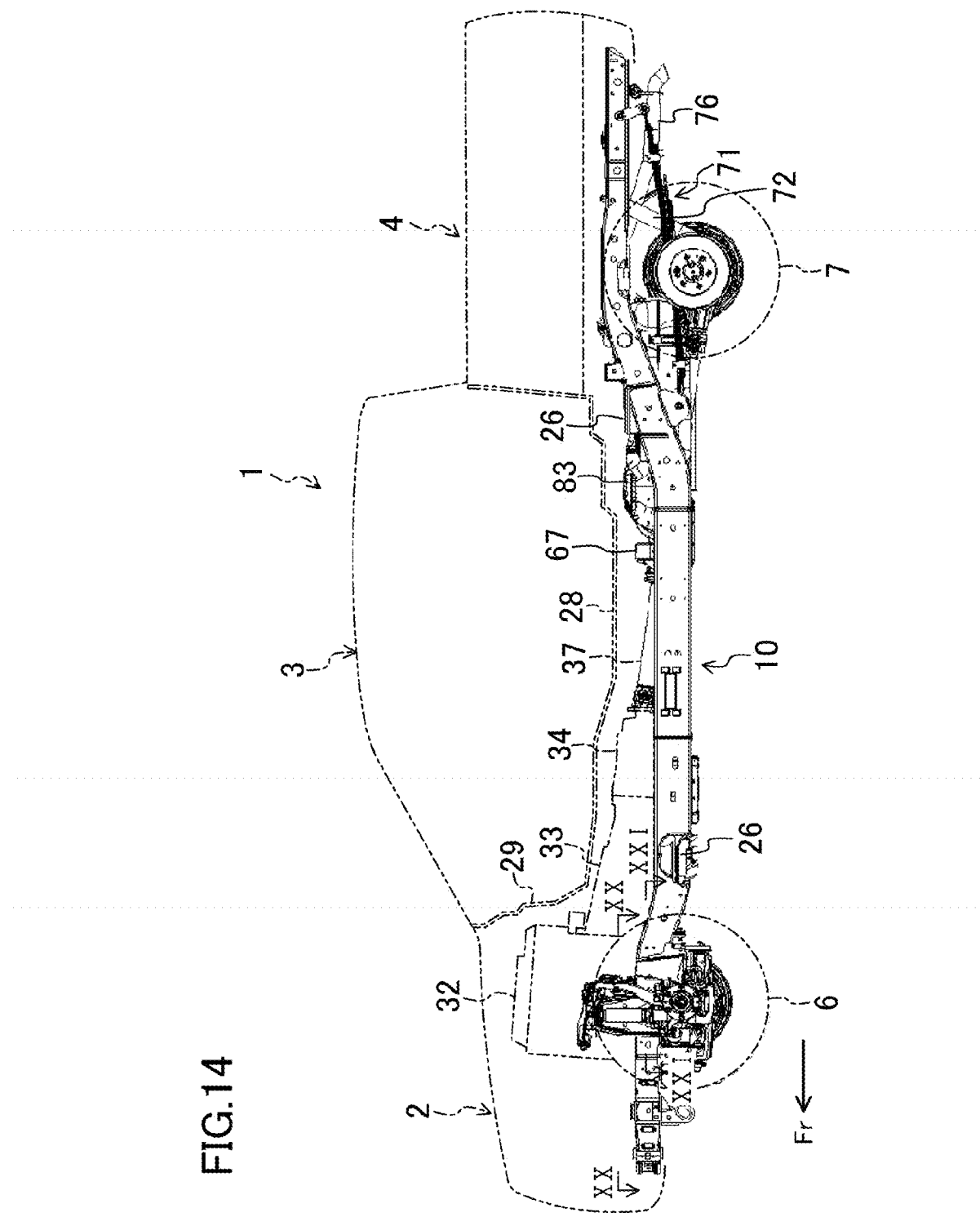
FIG. 14 is a side view of the component-mounted chassis frame from a left side of the vehicle.

Referring to FIGS. 1 and 14, the vehicle 1 includes, in this order from the front thereof, an engine room 2, a cabin 3, and a deck 4. The front, rear, left, and right of the vehicle 1 are hereinafter simply referred to as "front," "rear," "left," and "right." Note that, in FIGS. 2-18, 20-22, and 24-27, the front side of the vehicle 1 is represented by "Fr" (the same applies to FIGS. 29 and 31).

The vehicle 1 includes the chassis frame 9 in a lower part thereof. The chassis frame 9 includes a pair of right and left main frames (also called side frames) 10 extending in a vehicle length direction (longitudinal direction), and a plurality of cross-members (in the present embodiment, first to seventh cross-members 11-17 are provided in this order from the front) each connecting the main frames 10 together and extending in a vehicle width direction. The chassis frame 9 is in a ladder shape as viewed in the plane. Each of the main frames 10 includes an inner panel 20 arranged on an inner side in the vehicle width direction, and an outer panel 21 arranged on an outer side in the vehicle width direction. The main frame 10 is in a substantially rectangular shape as viewed in a cross section. A closed space is formed between the panels 20, 21 as viewed in the cross section.

The first cross-member 11 is attached to front ends of the main frames 10, and functions as a bumper reinforcement configured to reinforce a front bumper 5 (see FIG. 1). The second cross-member 12 is, at both end parts thereof, attached to the right and left main frames 10 through cross-member brackets 23 welded respectively to the right and left main frames 10. The third cross-member 13 is also, at both end parts thereof, attached to the right and left main frames 10 through cross-member brackets 24 welded respectively to the right and left main frames 10. The cross-member brackets 23 are considered as part of the second cross-member 12, and the cross-member brackets 24 are considered as part of the third cross-member 13. The fourth cross-member 14 is, at both end parts thereof, attached to the right and left main frames 10 through large gussets 25 welded respectively to the right and left main frames 10. The gussets 25 serve as brackets and reinforcements, and are considered as part of the fourth cross-member 14. Each of the fifth to seventh cross-members 15-17 is, at both end parts thereof, attached directly to the right and left main frames 10.

Each of the main frames 10 includes the following: a narrow part 10a positioned in an end part of the main frame 10 in the vehicle width direction below the engine room 2 such that a distance between the narrow parts 10a of the main frames 10 is short; a wide part 10b positioned below the cabin 3 and the deck 4 such that a distance between the wide parts 10b of the main frames 10 is longer than that between the narrow parts 10a; and a widened part 10c positioned between the narrow part 10a and the wide part 10b (in a rear end part of the engine room 2) such that a distance between the widened parts 10c of the main frames 10 is increased toward the rear (see FIG. 14 for a positional relationship among the parts 10a, 10b, 10c of the main frame 10, the engine room 2, the cabin 3, and the deck 4). The width (i.e., the cross-sectional area) of the wide part 10b itself is larger than the width (i.e., the cross-sectional area) of the narrow part 10a itself. The widened part 10c extends from a rear end of the narrow part 10a (the vicinity of a rear side of the third cross-member 13) toward the rear so as to be inclined toward the outer side in the vehicle width direction. The width (cross-sectional area) of the widened part 10c itself is increased toward the rear. The widened part 10c is connected to a front end of the wide part 10b (the vicinity of a front side of the fourth cross-member 14). Thus, the widened parts 10c of the main frames 10 and the third and fourth cross-members 13, 14 are together formed in a trapezoidal shape as viewed in the plane.

The wide part 10b is formed so as to have the maximum width (cross-sectional area) in a connection part of the wide part 10b and the fourth cross-member 14 and the vicinity thereof. The width (cross-sectional area) of the wide part 10b is gradually decreased from the fourth cross-member 14 to the sixth cross-member 16, and is substantially uniform in part of the wide part 10b from the sixth cross-member 16 toward the rear. As described above, the fourth cross-member 14 is connected to part of the wide part 10b where the width (cross-sectional area) thereof is large, and the connection part of the wide part 10b and the fourth cross-member 14 is reinforced by the large gusset 25.

Part of the wide part 10b of the main frame 10 below the cabin 3 is in a height position lower than the narrow part 10a, and the widened part 10c is downwardly inclined toward the rear. In addition, part of the wide part 10b of the main frame 10 below the deck 4 (part of the wide part 10b from the sixth cross-member 16 toward the rear) is in a height position higher than part of the wide part 10b below the cabin 3, and part of the wide part 10b below the cabin 3 is, at a rear part thereof, upwardly inclined toward the rear (see FIG. 14).

A cab-mount bracket 26 is attached to the widened part 10c of the main frame 10 in the vicinity of the front side of the fourth cross-member 14, and another cab-mount bracket 26 is attached to the wide part 10b of the main frame 10 in the vicinity of a front side of the sixth cross-member 16. Vehicle body members forming the cabin 3 are mounted on each of the cab-mount brackets 26 through a cab mount including a rubber member. Each of the cab-mount brackets 26 is welded to an outer surface of the main frame 10 in the vehicle width direction and to a lower surface of the main frame 10.

Of the vehicle body members forming the cabin 3, a vehicle body member forming a floor of the cabin 3 is a floor panel 28 and another vehicle body member partitioning between the engine room 2 and the cabin 3 is a dash panel 29, referring to FIG. 14. A lower end of the dash panel 29 is connected to a front end of the floor panel 28. A rear end part of the floor panel 28 is upwardly bent, and partitions between the cabin 3 and the deck 4.

Referring to FIG. 13, a drive system of the vehicle 1 includes an engine 32, a transmission 33, a power transfer unit 34, a front wheel propeller shaft 35, a front differential gear unit 36, a rear wheel propeller shaft 37, and a rear differential gear unit 38. In the present embodiment, the vehicle 1 is a four-wheel-drive vehicle (4WD vehicle) in which front wheels 6 and rear wheels 7 are driven. However, the vehicle 1 may be a two-wheel-drive vehicle (2WD vehicle) in which only the rear wheels 7 are driven. In the case of the 2WD vehicle, the power transfer unit 34, the front wheel propeller shaft 35, and the front differential gear unit 36 are not provided.

The engine 32 is a longitudinal engine including a plurality of cylinders (in the present embodiment, five cylinders) arranged in rows in the vehicle length direction, and the transmission 33 is connected to a rear side of the engine 32.

Figure 15:
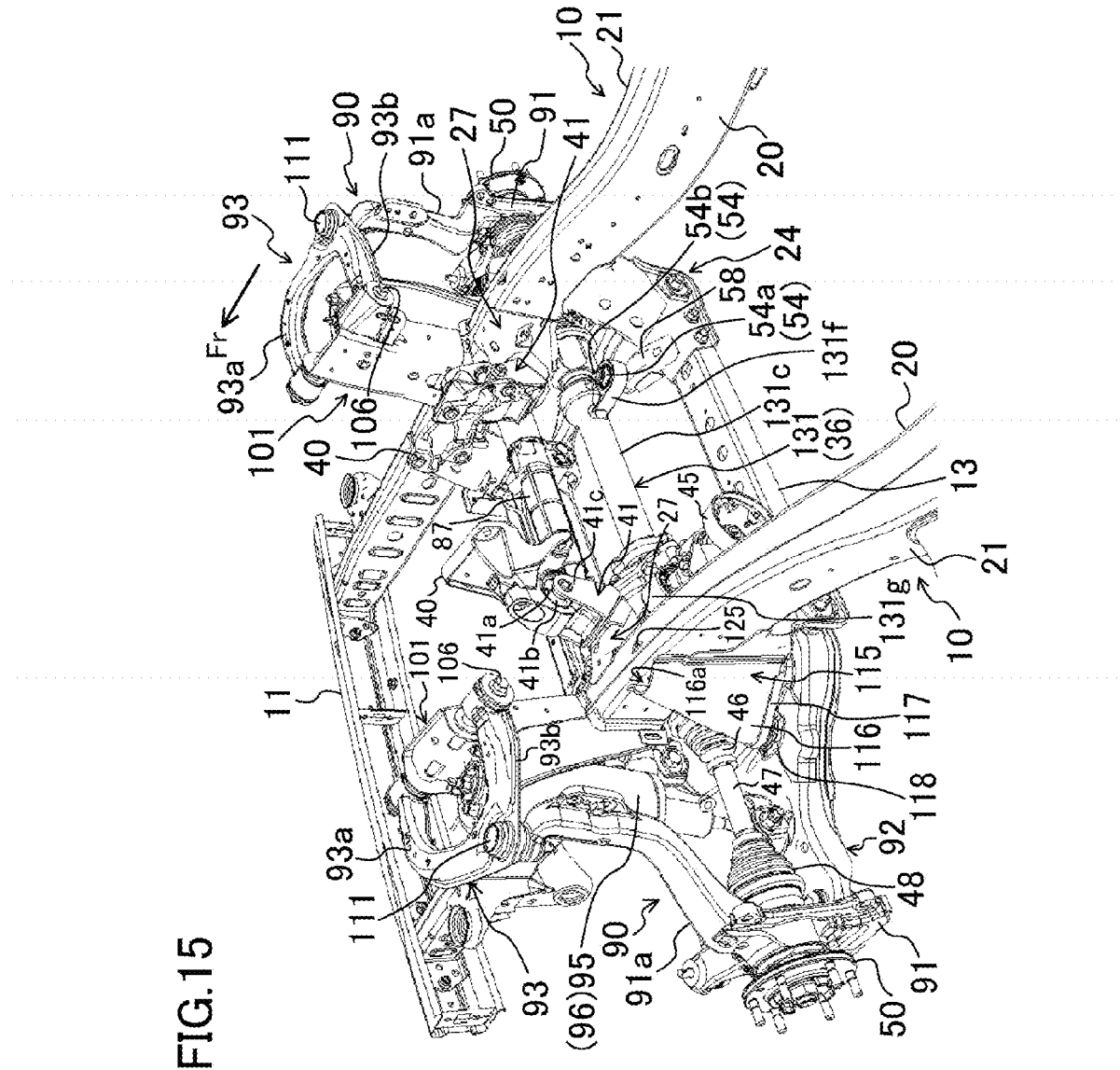
FIG. 15 is a perspective view of the front part of the component-mounted chassis frame diagonally from the upper left rear side of the vehicle.

Referring to FIG. 15, a bracket 40 protruding toward the left is attached to a left side surface of the engine 32, and a bracket 40 protruding toward the right is attached to a right side surface of the engine 32. In a tip end part of the bracket 40, an engine mount 41 including a cylindrical rubber bush 41a is held such that a central axis of the rubber bush 41a extends in the vehicle length direction. The engine mount 41 further includes a central shaft 41b penetrating a center part of the rubber bush 41a in the vehicle length direction, and a support member 41c configured to support the central shaft 41b at both ends thereof. An engine mount bracket 27 is attached to the narrow part 10a of the main frame 10 so as to be positioned below the support member 41c. The support member 41c is attached onto the engine mount bracket 27, and therefore the engine 32 is elastically supported on the engine mount brackets 27 through the brackets 40 and the engine mounts 41.

Referring to FIGS. 7-9 and 21, each of the engine mount brackets 27 includes an upper member 27a and a lower member 27b which are welded to an inner surface of the main frame 10 in the vehicle width direction (surface of the inner panel 20 of the main frame 10) and protrude from the inner surface toward the inner side in the vehicle width direction. The upper member 27a is formed in a substantially inverted U-shape as viewed in a cross section along the vehicle length direction, and the lower member 27b is formed in a substantially U-shape as viewed in the cross section along the vehicle length direction. Side end parts of the upper member 27a in the vehicle length direction and side end parts of the lower member 27b in the vehicle length direction are joined together. That is, the side end part of the upper member 27a on the front and the side end part of the lower member 27b on the front are joined together, and the side end part of the upper member 27a on the rear and the side end part of the lower member 27b on the rear are joined together. A space is formed between the members 27a, 27b, and opens on the inner side in the vehicle width direction. The support member 41c of the engine mount 41 is attached to an upper surface of the upper member 27a through a reinforcing member 27c. On the other hand, a notch 27d opening on the inner side in the vehicle width direction and formed in a substantially U-shape as viewed in the plane is formed in a bottom part (horizontally-extending part) of the lower member 27b (see FIGS. 9 and 21). The notch 27d is formed so that the engine mount bracket 27 can be compressed and deformed in the vehicle length direction as much as possible upon a frontal collision of the vehicle 1. At the inner surface of the main frame 10 in the vehicle width direction (surface of the inner panel 20 of the main frame 10), an elongated hole 128 extending in the vehicle length direction is formed so as to overlap with the engine mount bracket 27 in the vehicle length direction (formed in a position corresponding the space between the members 27a, 27b) (see FIG. 9). The elongated hole 128 allows the engine mount bracket 27 and an attachment part of the main frame 10 and the engine mount bracket 27 to be compressed and deformed in the vehicle length direction as much as possible.

The power transfer unit 34 is connected to a rear side of the transmission 33, and distributes output of the transmission 33 to the front wheels 6 and the rear wheels 7. A mount attachment part 14a provided in a center part of an upper surface of the fourth cross-member 14 in the vehicle width direction supports the power transfer unit 34 through a rubber mount.

In the case of the 2WD vehicle, the power transfer unit 34 is not provided. Thus, the rear wheel propeller shaft 37 is extended toward the front by the size of the power transfer unit 34, and is connected to a rear end of the transmission 33.

An extension extending toward the rear so as to reach the mount attachment part 14a provided on the upper surface of the fourth cross-member 14 is formed in a lower part of the transmission 33 (part of the transmission 33 below a connection part of the transmission 33 and the rear wheel propeller shaft 37), and the transmission 33 is, at the extension, supported by the mount attachment part 14a through the rubber mount.

A rear end of the front wheel propeller shaft 35 extending along a left side of the transmission 33 in the vehicle length direction is connected to a left side part (part protruding toward the left) of the power transfer unit 34, and a front end of the rear wheel propeller shaft 37 extending in the vehicle length direction is connected to a rear end of the power transfer unit 34.

The rear end of the front wheel propeller shaft 35 is connected to the power transfer unit 34 through a constant velocity joint 44, and a front end of the front wheel propeller shaft 35 is connected to the front differential gear unit 36 (specifically connected to an input shaft which will be described later) through a constant velocity joint 45.

Referring to FIGS. 15-20, the front differential gear unit 36 includes a case 131 accommodating a differential gear etc. The case 131 includes a gear accommodation part 131a accommodating the differential gear, a left output shaft accommodation part 131b accommodating a left output shaft extending in the vehicle width direction, a right output shaft accommodation part 131c accommodating a right output shaft extending in the vehicle width direction, and an input shaft accommodation part 131d connected to the front wheel propeller shaft 35 and accommodating the input shaft extending in the vehicle length direction. The left output shaft accommodation part 131b is in a cylindrical shape covering the left output shaft, and the right output shaft accommodation part 131c is in a cylindrical shape covering the right output shaft. The left output shaft accommodation part 131b extends toward one side of the gear accommodation part 131a in the vehicle width direction, and the right output shaft accommodation part 131c extends toward the other side of the gear accommodation part 131a in the vehicle width direction. The input shaft accommodation part 131d extends from the gear accommodation part 131a toward the rear, and a rear end part of the input shaft (i.e., the constant velocity joint 45) protrudes from a rear end of the input shaft accommodation part 131d.

Since the front wheel propeller shaft 35 is positioned on the left of the transmission 33, the gear accommodation part 131a is positioned on the left of the engine 32. Thus, the length of the right output shaft accommodation part 131c in the vehicle width direction is longer than that of the left output shaft accommodation part 131b, and the right output shaft accommodation part 131c passes below the engine 32 and extends to the vicinity of the right main frame 10.

Figure 16:
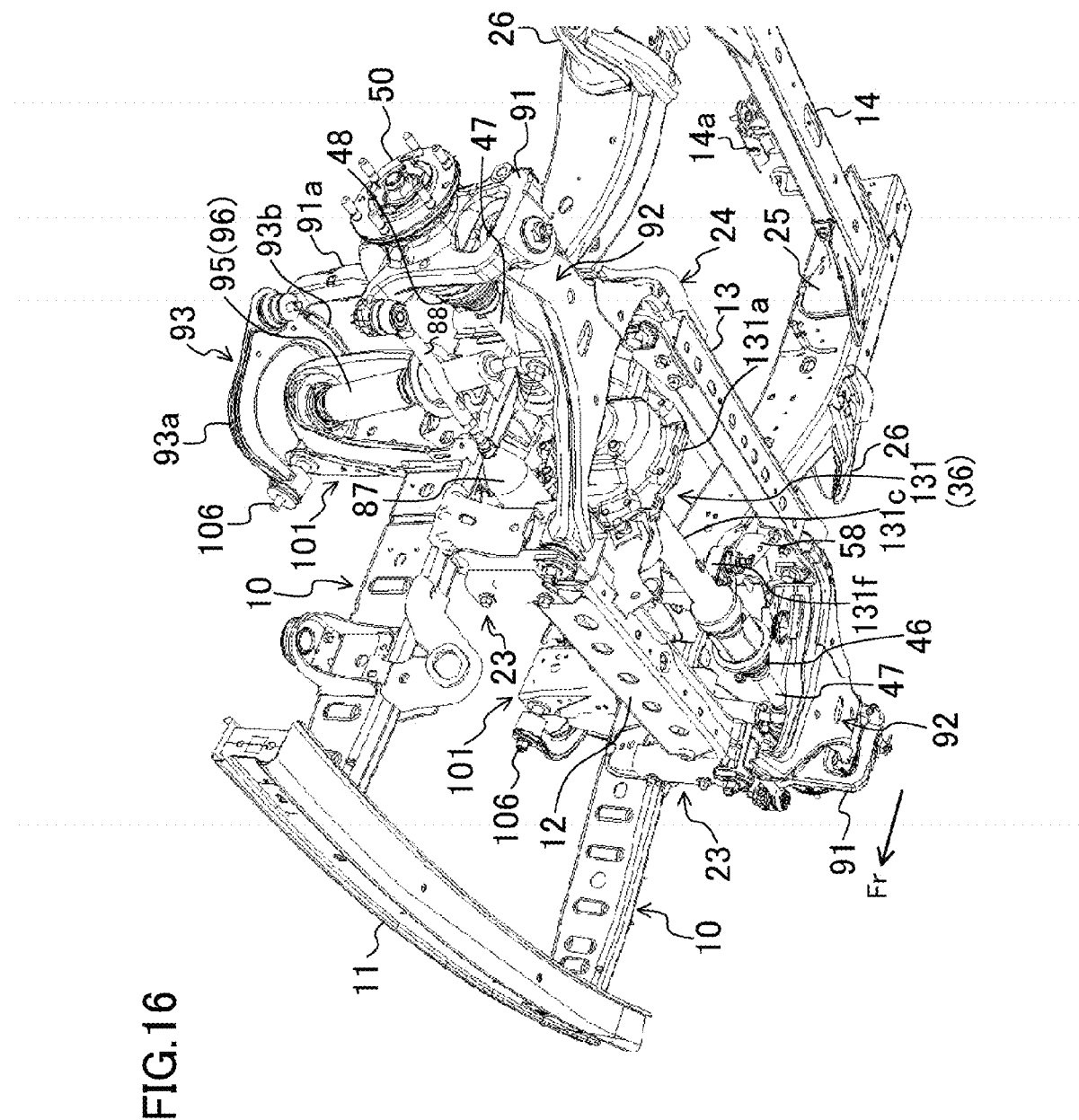
FIG. 16 is a perspective view of the front part of the component-mounted chassis frame diagonally from a lower left front side of the vehicle.
Figure 17:
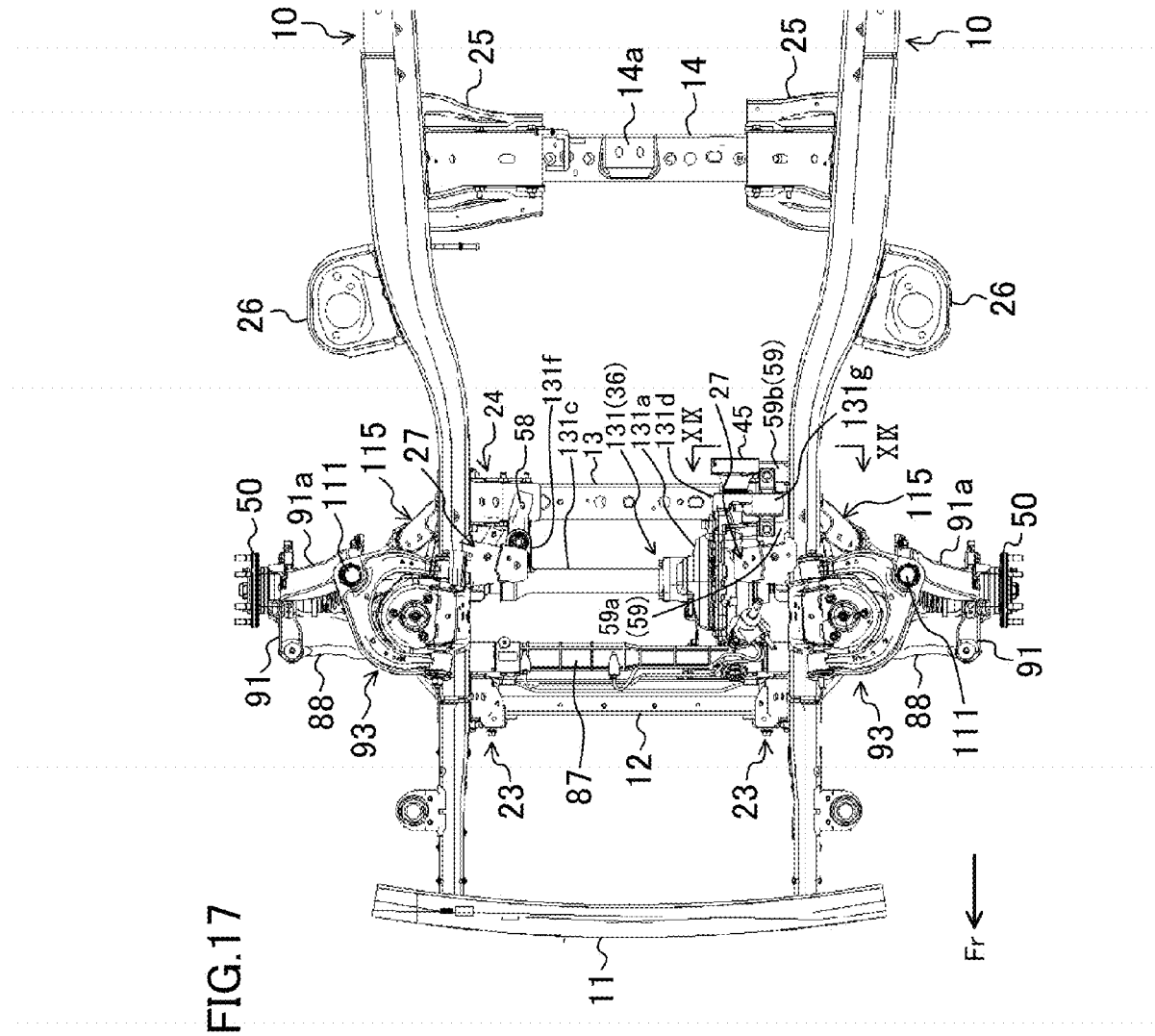
FIG. 17 is a plan view illustrating the front part of the component-mounted chassis frame.
Figure 18:
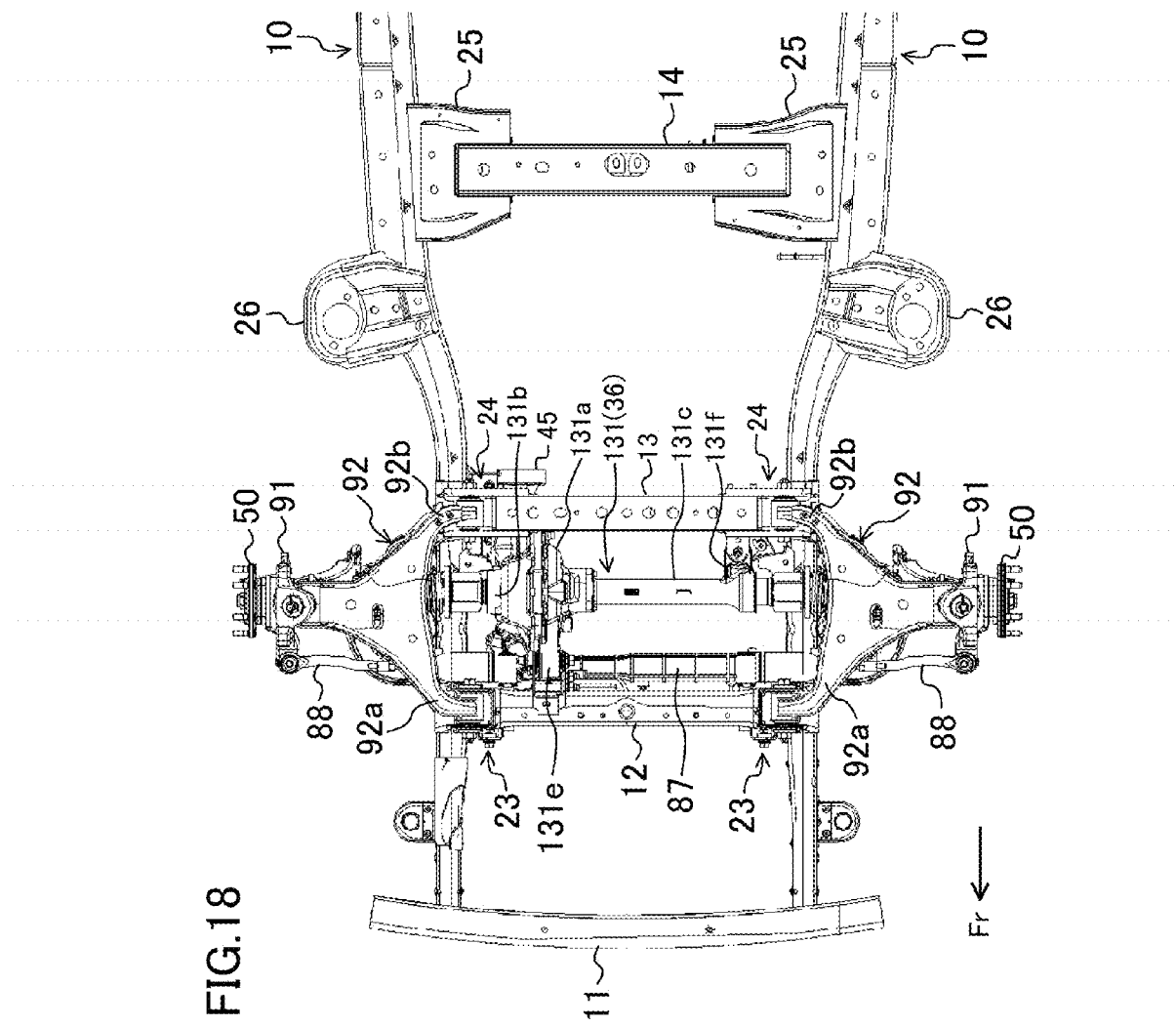
FIG. 18 is a bottom view illustrating the front part of the component-mounted chassis frame.
Figure 19:
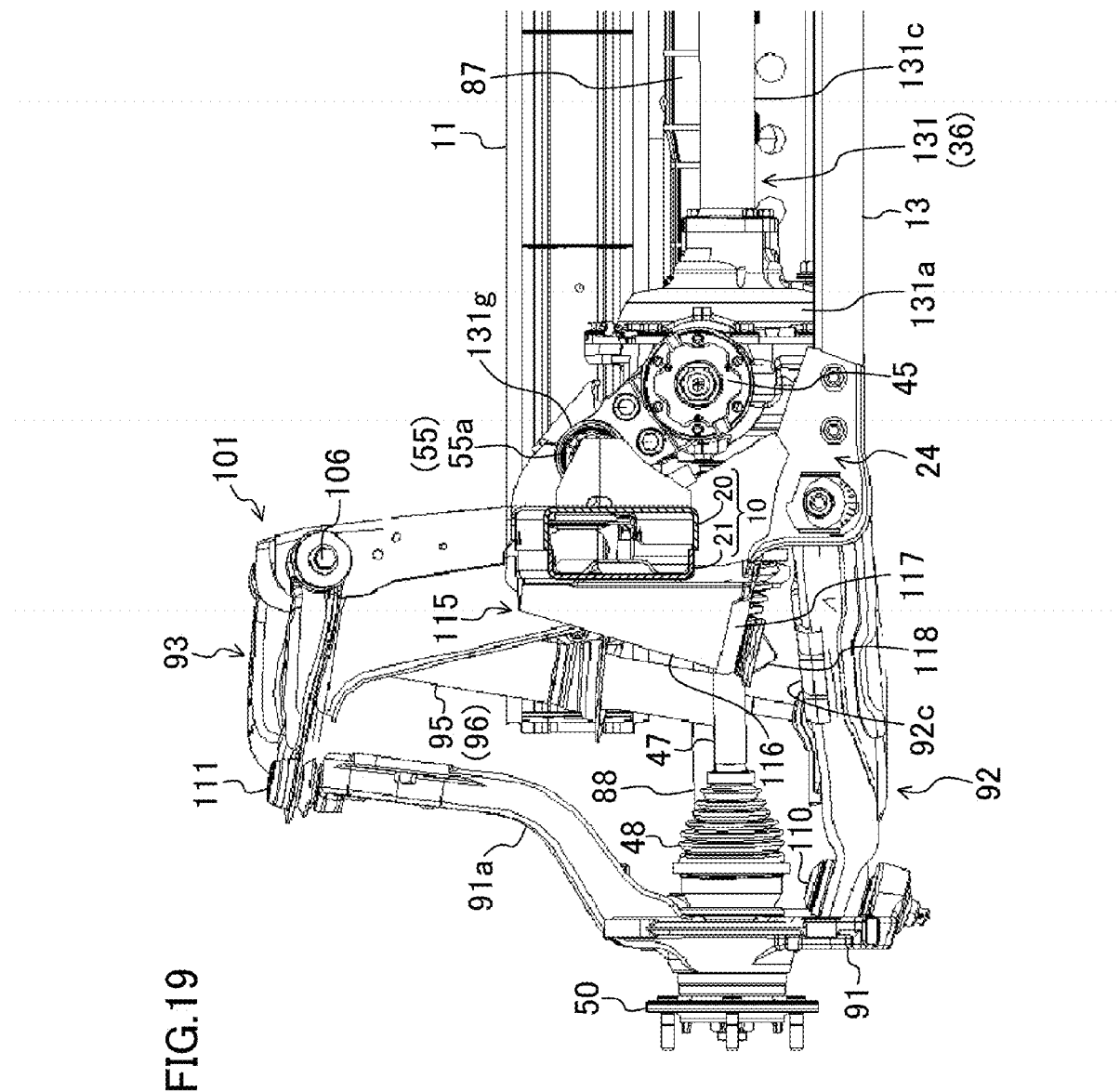
FIG. 19 is a cross-sectional view along an XIX-XIX line illustrated in FIG. 17.

Referring to FIGS. 15 and 16, one of the output shafts is connected to a right front wheel drive shaft 47 extending in the vehicle width direction through a constant velocity joint accommodated in a boot 46, and the other output shaft is connected to a left front wheel drive shaft 47 extending in the vehicle width direction through a constant velocity joint accommodated in a boot 46. The right front wheel drive shaft 47 is connected to a hub 50 holding the right front wheel 6 through a constant velocity joint accommodated in a boot 48, and the left front wheel drive shaft 47 is connected to a hub 50 holding the left front wheel 6 through a constant velocity joint accommodated in a boot 48. Such constant velocity joints are adaptable to vertical movement of the front wheel 6 relative to the output shaft and movement of the front wheel 6 by steering which will be described later.

According to the foregoing configuration, power of the engine 32 is transmitted to the right and left front wheels 6 through the transmission 33, the power transfer unit 34, the front wheel propeller shaft 35, the front differential gear unit 36, and the right and left front wheel drive shafts 47.

The front differential gear unit 36 is elastically supported by the chassis frame 9 at three points. Specifically, a first mount bracket 57 configured to support a first mount 53 including a cylindrical rubber bush 53a is provided in a position closer to the left on a rear surface of the second cross-member 12 (see FIGS. 3, 5, 6, 20, and 21). In addition, a second mount bracket 58 configured to support a second mount 54 including a cylindrical rubber bush 54a is provided in a right end part of an upper surface of the third cross-member 13 (specifically on an upper surface of the cross-member bracket 24) (see FIGS. 3, 4, and 15-17). Further, a third mount bracket 59 configured to support a third mount 55 including a cylindrical rubber bush 55a is provided in a position above the third cross-member 13 on the inner surface of the left main frame 10 in the vehicle width direction (see FIGS. 3, 4, 7-9, 17, and 20). The third mount bracket 59 is divided into a front divided part 59a and a rear divided part 59b.

The first mount 53 further includes a central shaft 53b penetrating a center part of the rubber bush 53a. The central shaft 53b is, at both end parts thereof, supported by the first mount bracket 57. In such a support state, the central shaft 53b extends in the vehicle width direction.

The second mount 54 further includes a central shaft 54b penetrating a center part of the rubber bush 54a. The central shaft 54b extends in the vertical direction. One end part (lower end part) of the central shaft 54b is an external thread part to be engaged with an internal thread part of a weld nut provided on a lower surface of the second mount bracket 58, and the other end part (upper end part) of the central shaft 54b is in a hexagonal shape so as to be engaged with a tool for fastening the external thread part into the internal thread part. The second mount 54 is supported on the second mount bracket 58 in the foregoing fastening state.

The third mount 55 further includes a central shaft 55b penetrating a center part of the rubber bush 55a. The central shaft 55b extends in the vehicle length direction. Both of end parts of the central shaft 55b are in a plate shape extending in the horizontal direction, and are, from above, fastened respectively to the front divided part 59a and the rear divided part 59b with bolts 60 (see FIGS. 9 and 20).

Figure 20:
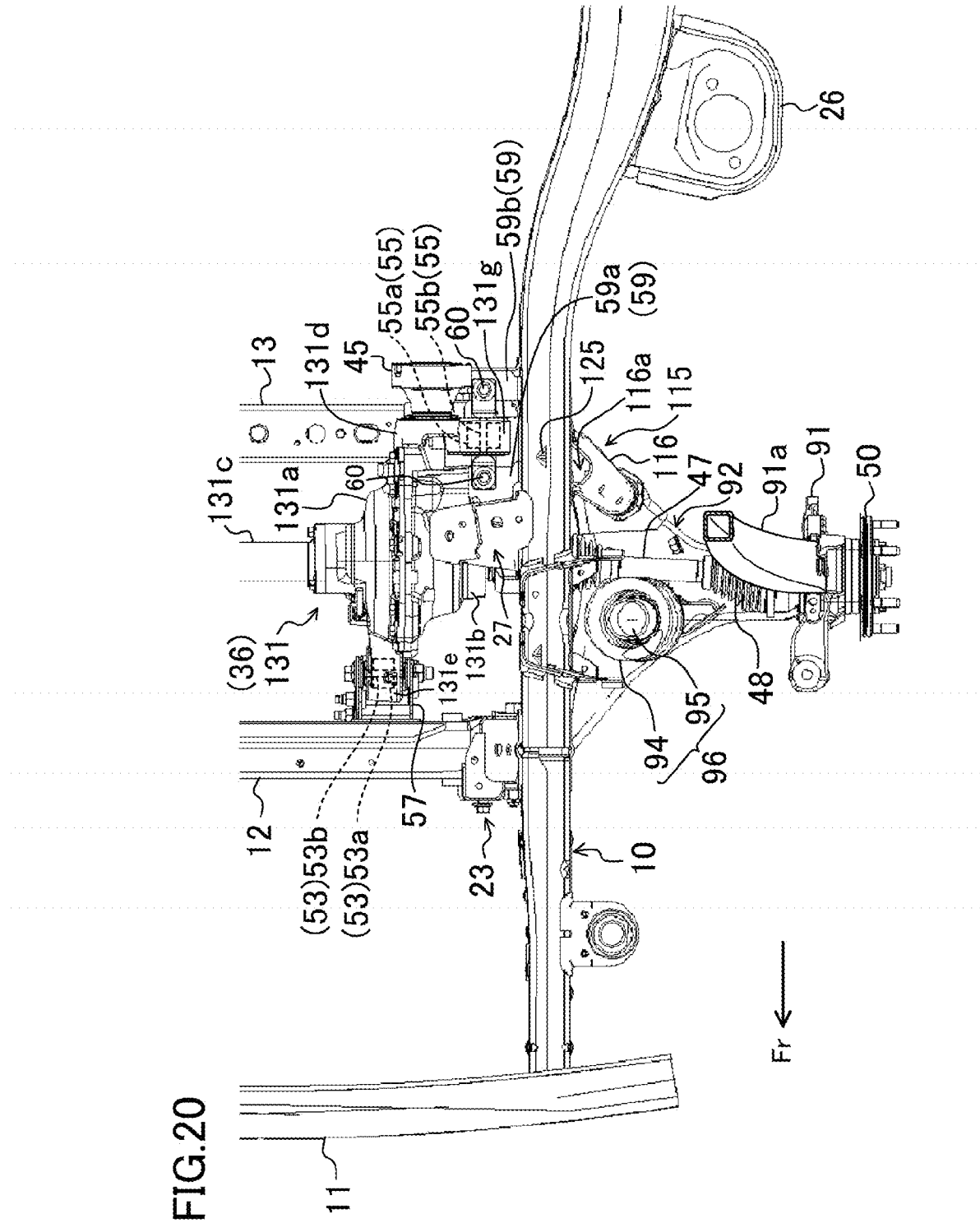
FIG. 20 is a cross-sectional view along an XX-XX line illustrated in FIG. 14.
Figure 21:
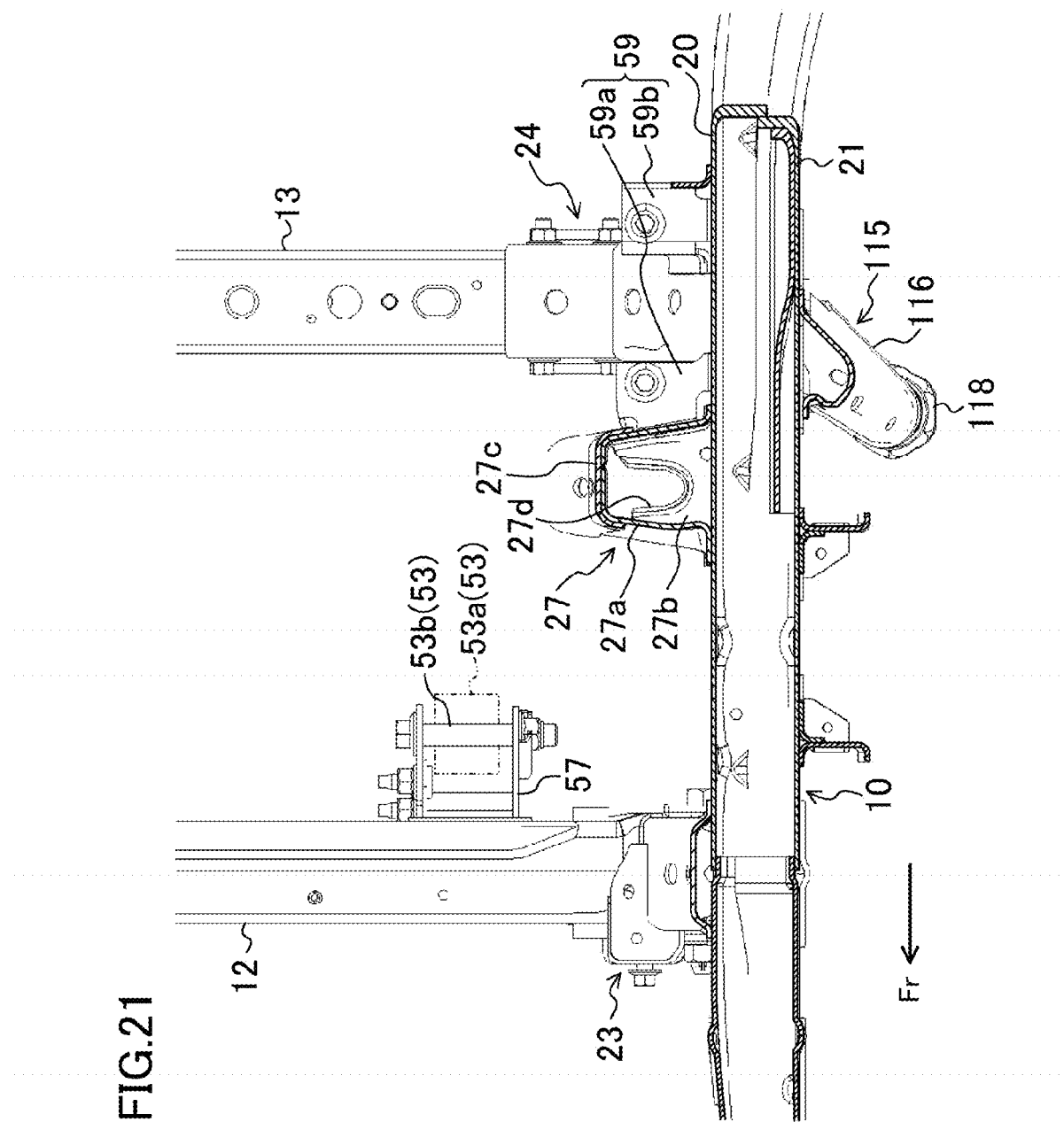
FIG. 21 is a cross-sectional view along an XXI-XXI line illustrated in FIG. 14 (note that most of the mounted components illustrated in FIG. 20 are not shown).
Figure 22:
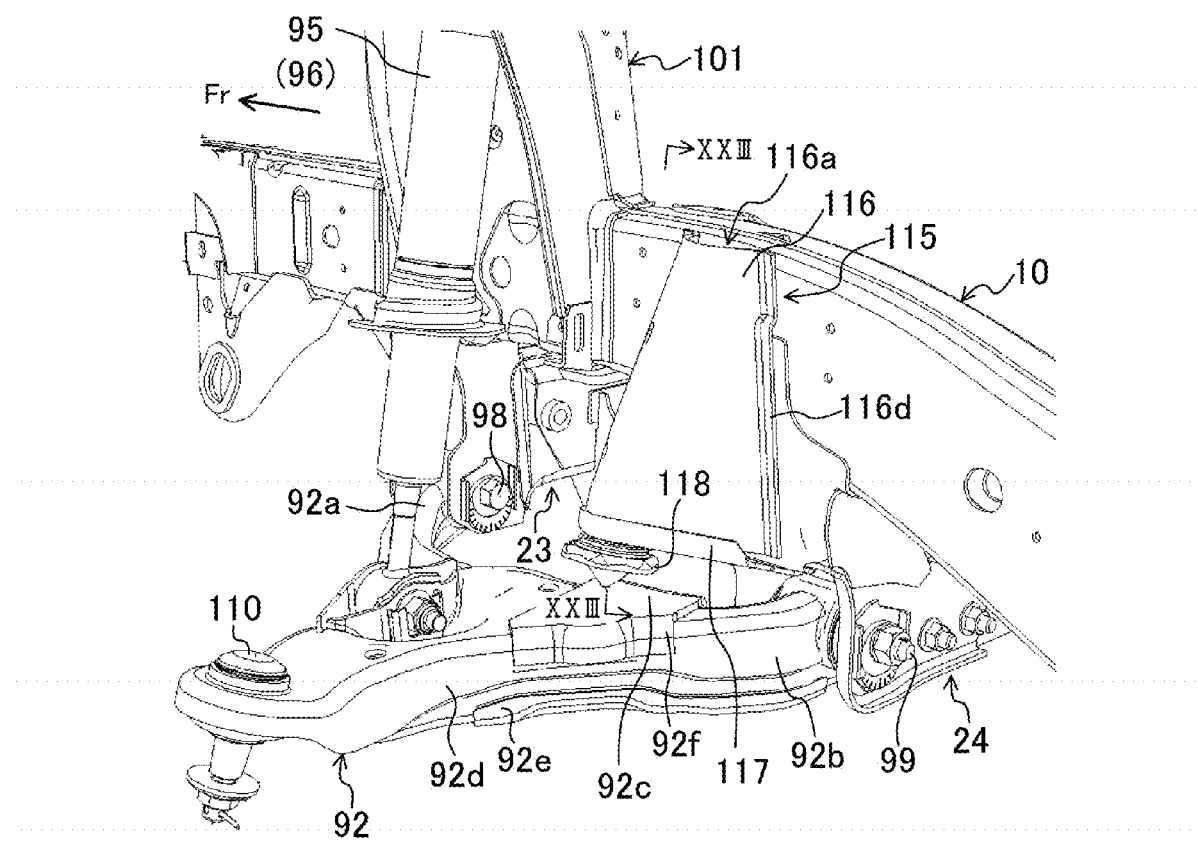
FIG. 22 is a perspective view illustrating the vicinity of a bump stopper in the outer part of the left main frame of the component-mounted chassis frame in the vehicle width direction.
Figure 23:
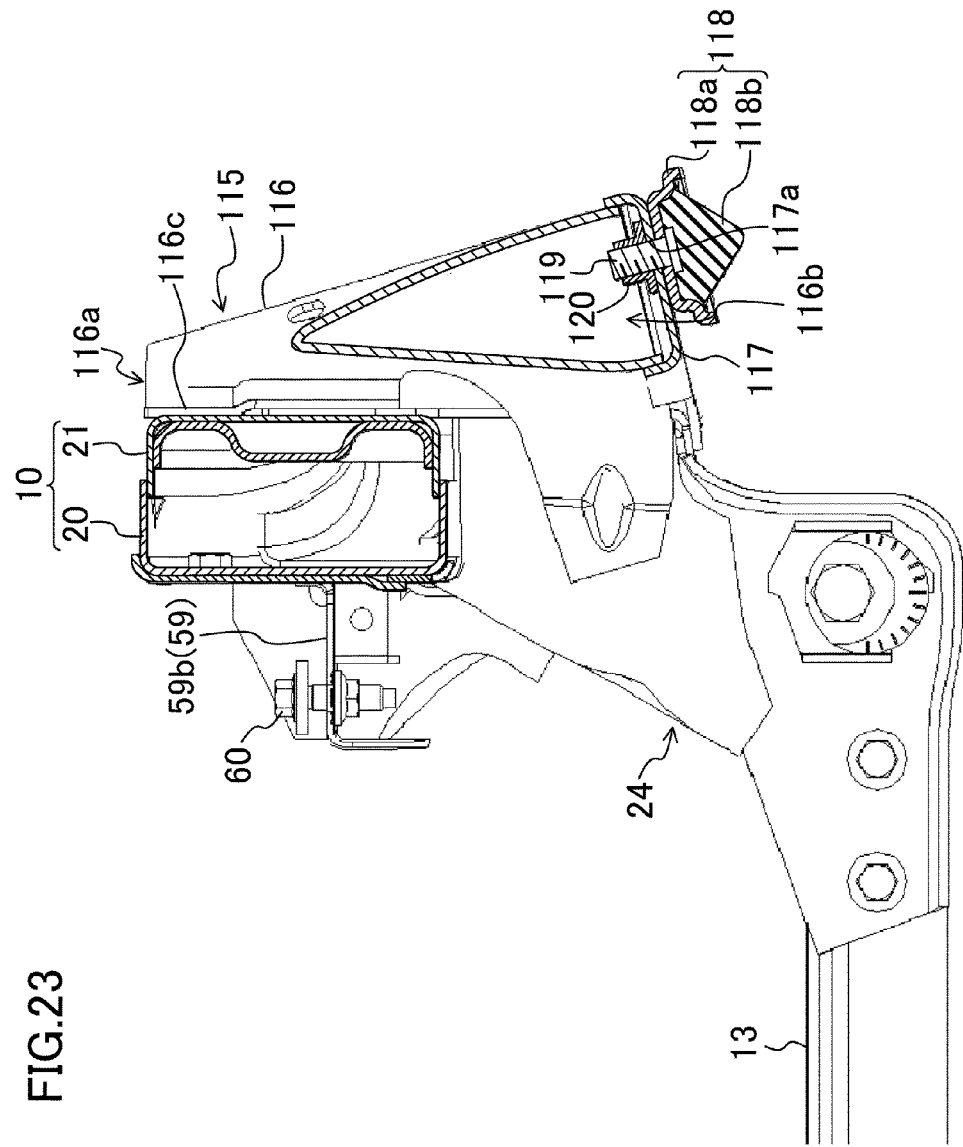
FIG. 23 is a cross-sectional view along an XXIII-XXIII line illustrated in FIG. 22.

A first mount holding part 131e protruding toward the front and configured to hold, at a tip end thereof, the periphery of the rubber bush 53a of the first mount 53 is formed in a front part of the gear accommodation part 131a of the front differential gear unit 36 (see FIG. 20). In addition, a second mount holding part 131f protruding toward the rear and configured to hold, at a tip end thereof, the periphery of the rubber bush 54a of the second mount 54 is formed in a tip end part (right end part) of the right output shaft accommodation part 131c (see FIGS. 15 and 17). Further, a third mount holding part 131g protruding toward the upper left and configured to hold, at a tip end thereof, the periphery of the rubber bush 55a of the third mount 55 is formed in a rear part of the input shaft accommodation part 131d (see FIGS. 17 and 20).

Thus, the front differential gear unit 36 is attached to the chassis frame 9 through the first to third mounts 53-55 and the first to third mount brackets 57-59. In such a state, the central shafts 53b, 54b, 55b of the first to third mounts 53-55 extend in directions different from each other. As a result, vibration components generated in the front differential gear unit 36 in any directions are less likely to be transmitted to the chassis frame 9.

In the case of the 2WD vehicle, the front differential gear unit 36 is not provided. Thus, the first to third mount brackets 57-59 are not provided.

Figure 24:
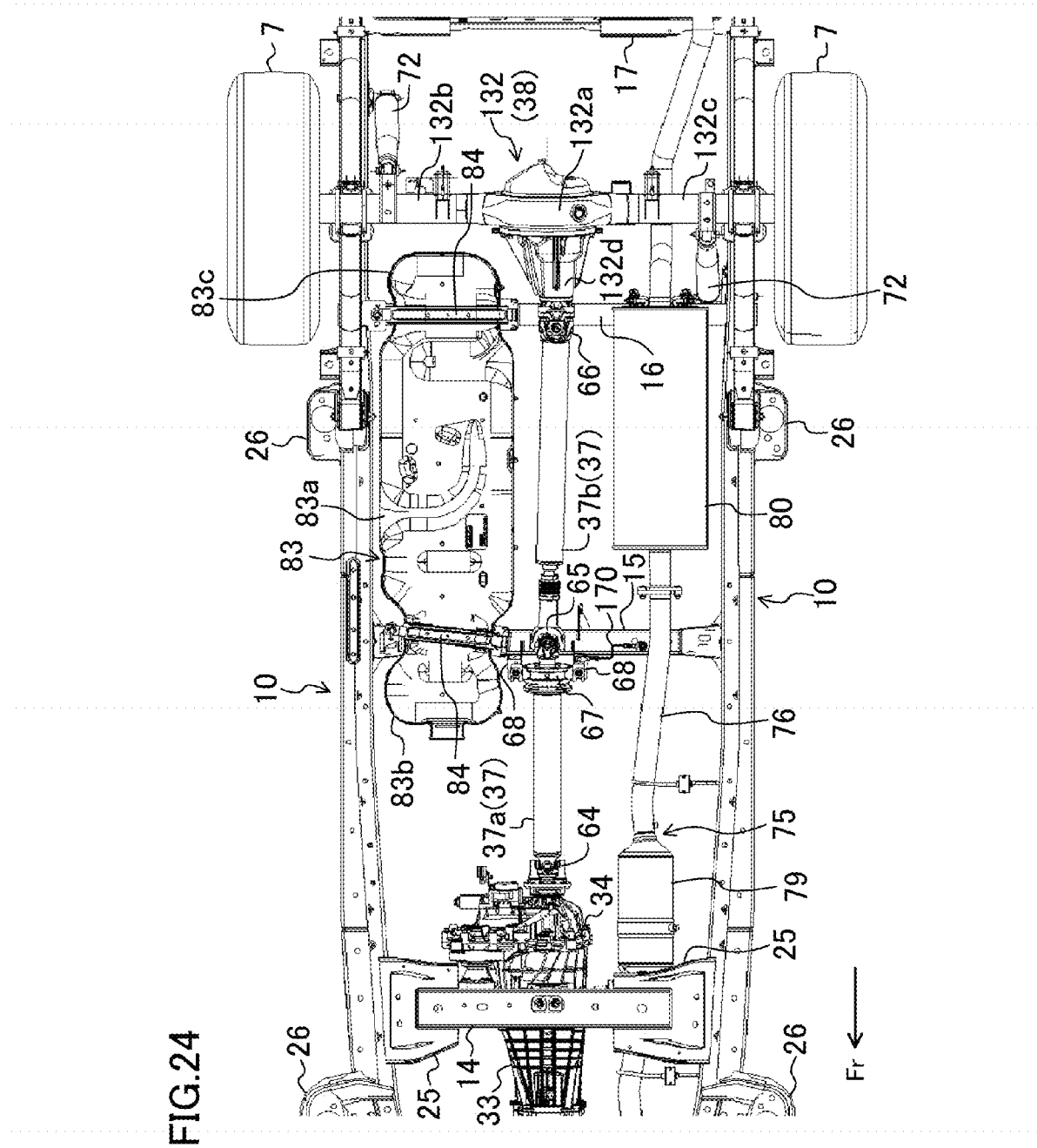
FIG. 24 is a bottom view illustrating a rear part of the component-mounted chassis frame.

Referring to FIGS. 13 and 24, the rear wheel propeller shaft 37 includes a front shaft 37*a* and a rear shaft 37*b* connected together through a joint (in the present embodiment, a universal joint 65). A front end of the front shaft 37*a* is connected to the rear end of the power transfer unit 34 through a universal joint 64, and a rear end of the front shaft 37*a* is connected to a front end of the rear shaft 37*b* through the universal joint 65 (see FIG. 24) positioned below the fifth cross-member 15. The front shaft 37*a* extends, as viewed in the plane, straight from the universal joint 64 toward the rear in the middle between the main frames 10 in the vehicle width direction. The front shaft 37*a* is downwardly inclined toward the rear.

Referring to FIG. 24 (since FIG. 24 is a bottom view, the right and left are opposite as those shown in FIG. 13), the rear shaft 37*b* extends from the universal joint 65 toward the rear, and is connected to the rear differential gear unit 38 (specifically connected to an input shaft which will be described later) through a universal joint 66. The rear shaft 37*b* is downwardly inclined toward the rear, and is slightly inclined toward a rear right side (a side opposite to a fuel tank 83 which will be described later) as viewed in the plane. Thus, as viewed in the plane, the rear wheel propeller shaft 37 is bent at the universal joint 65 (specifically a later-described joint part 65*a* of the universal joint 65) such that the universal joint 65 (joint part 65*a*) is positioned on the left relative to a straight line connecting both front and rear ends of the rear wheel propeller shaft 37 (the front end of the front shaft 37*a* and a rear end of the rear shaft 37*b*). The entirety of the rear wheel propeller shaft 37 is arranged so as to be downwardly inclined toward the rear and to pass below the fifth cross-member 15.

The rear wheel propeller shaft 37 is, at a middle part in a length direction thereof, rotatably supported by a propeller shaft center bearing 67 (hereinafter simply referred to as a "center bearing 67"). Specifically, the rear wheel propeller shaft 37 is, at the vicinity of the rear end of the front shaft 37*a* (part of the front shaft 37*a* near the universal joint 65), rotatably supported by the center bearing 67. The center bearing 67 is supported by two bearing brackets 68 attached to the fifth cross-member 15, and is positioned closer to the front relative to the fifth cross-member 15 and positioned near the fifth cross-member 15.

Figure 25:
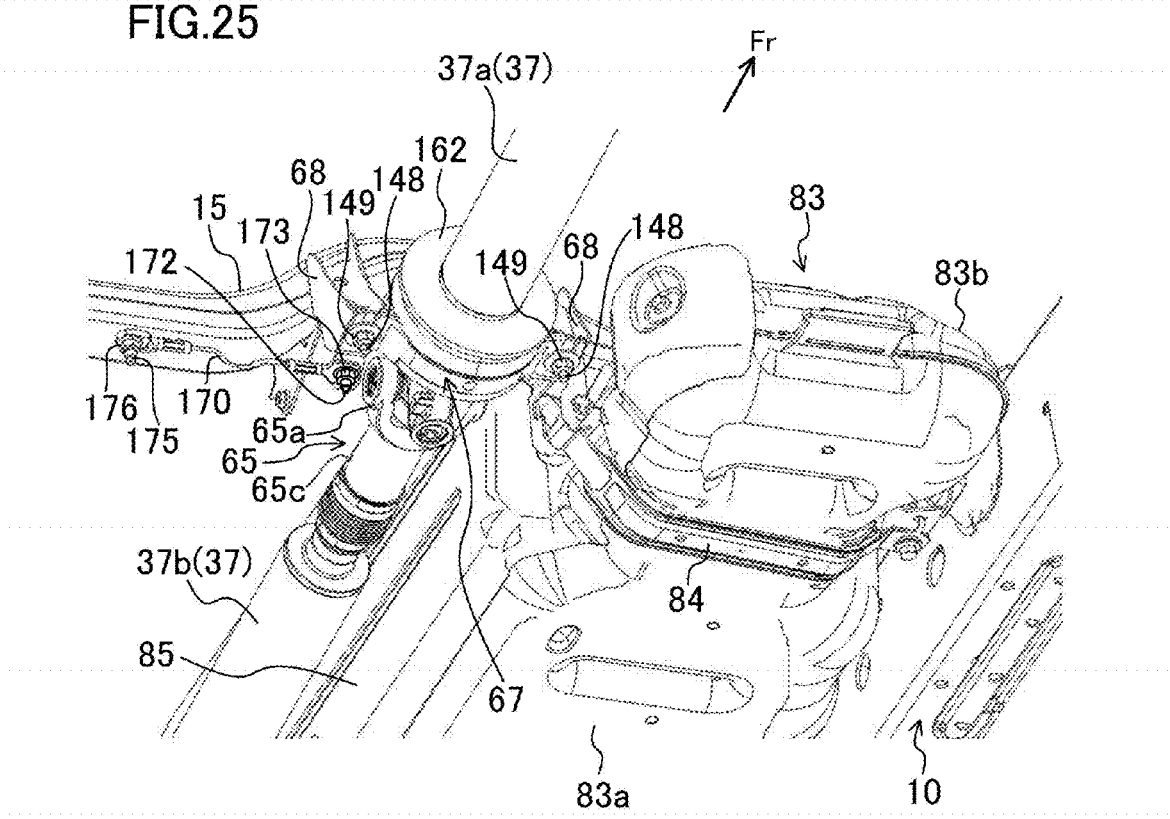
FIG. 25 is a perspective view of the vicinity of a propeller shaft center bearing diagonally from a lower right front side of the vehicle.
Figure 26:
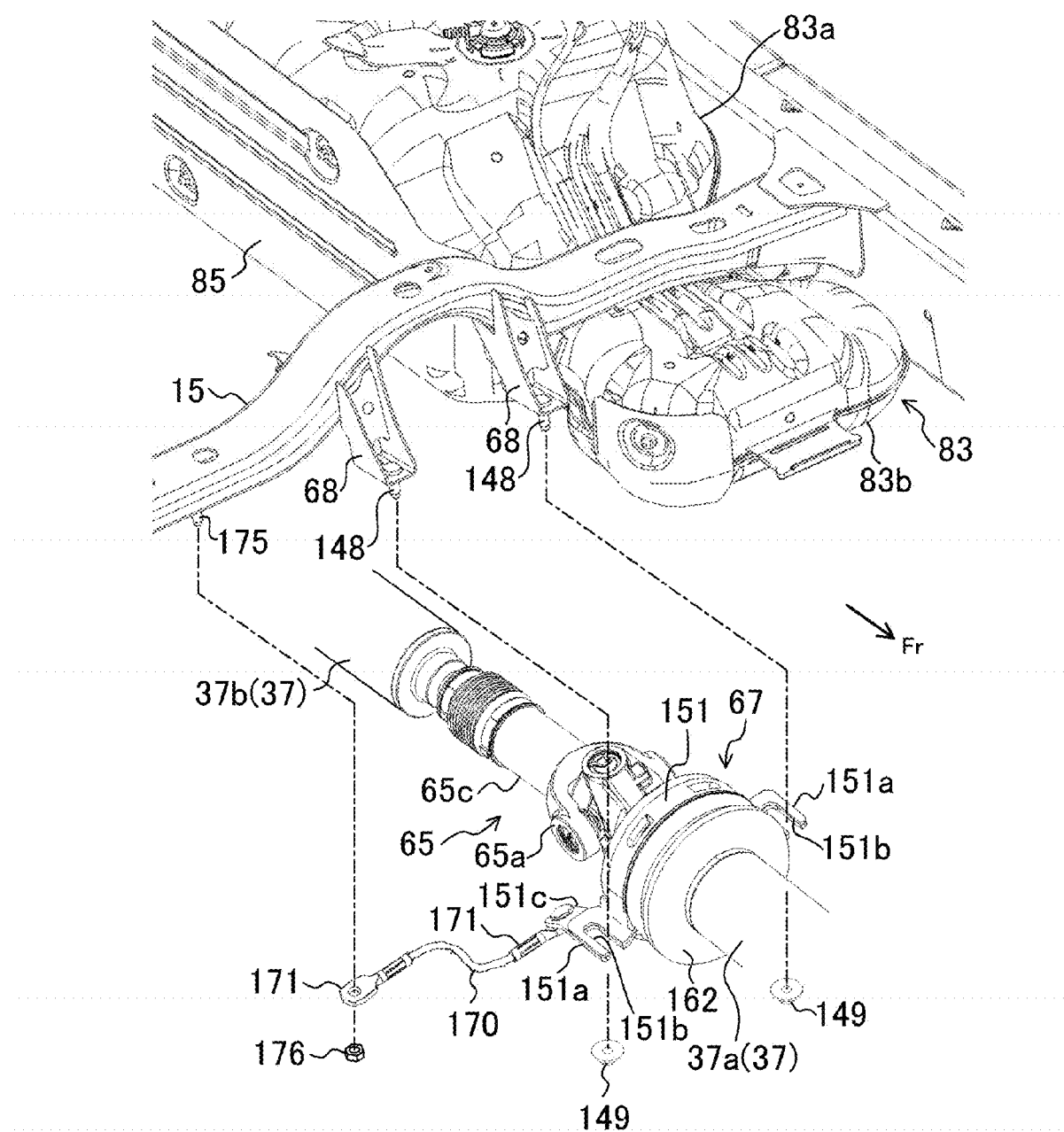
FIG. 26 is a perspective view of the vicinity of a bearing bracket provided on a fifth cross-member, diagonally from the lower right front side of the vehicle.

Referring to FIGS. 25 and 26, the bearing bracket 68 is arranged on both sides of the center bearing 67 in the vehicle width direction. The center bearing 67 includes an outer cylindrical body 151 (see FIGS. 26 and 27), and attachment parts 151*a* extending substantially in the horizontal direction and each configured to attach the outer cylindrical body 151 (center bearing 67) to the bearing bracket 68 are formed so as to protrude respectively from parts of an outer peripheral surface of the outer cylindrical body 151 on both sides of the outer cylindrical body 151 in the vehicle width direction (see FIG. 26). A notch 151*b* opening to the front is formed in each of the attachment part 151*a* (see FIG. 26).

A stud bolt 148 is provided so as to downwardly protrude from the bearing bracket 68. After the stud bolt 148 is inserted into the notch 151*b*, the stud bolt 148 is fastening into a nut 149 having a flange. Thus, each of the attachment parts 151*a* is fixed to a lower surface of the bearing bracket 68. The notch 151*b* of the attachment part 151*a* opens to the front. That is, each of the attachment parts 151*a* is in such a shape that the attachment part 151*a* can approach the bearing bracket 68 (fifth cross-member 15) from the rear and can reach a fixing position thereof. Thus, when great impact force (impact force greater than a preset reference value) from the front to the rear acts on the center bearing 67 as described later, the attachment part 151*a* moves toward the rear relative to the bearing bracket 68 (fifth cross-member 15), and the outer cylindrical body 151 (center bearing 67) is detached from the bearing bracket 68 (fifth cross-member 15). Consequently, the rear wheel propeller shaft 37 is, together with the center bearing 67, dropped from the fifth cross-member 15.

Figure 27:
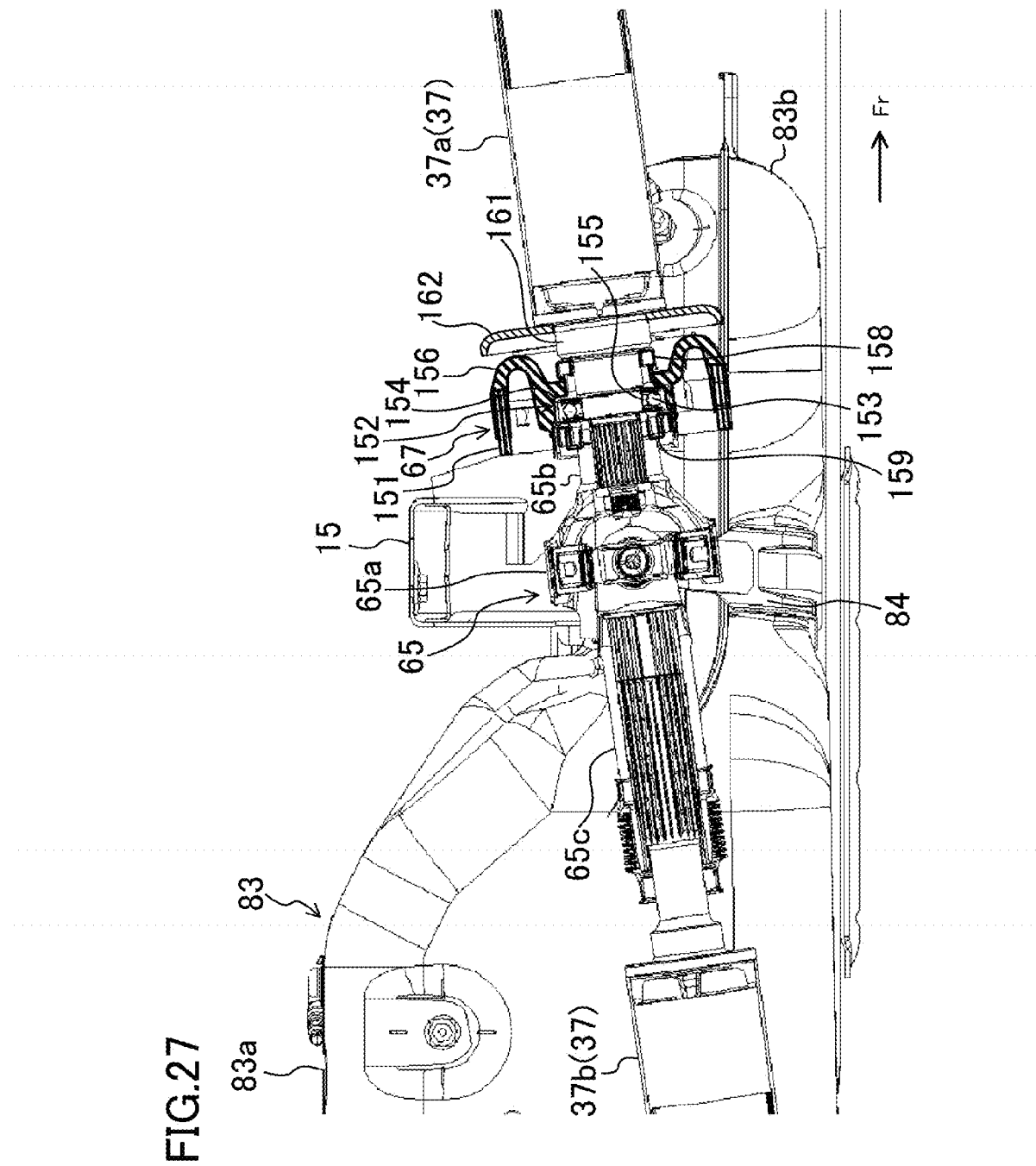
FIG. 27 is a cross-sectional view of FIG. 13 along an XXVII-XXVII.

Referring to FIG. 27, in the outer cylindrical body 151, a bearing body 152 including a plurality of balls 153, an outer race 154, and an inner race 155 is provided. The outer cylindrical body 151 and the bearing body 152 are connected together through a rubber 156. The rubber 156 connects between the outer cylindrical body 151 and the outer race 154. A middle part of the rubber 156 protrudes toward the front relative to a front end of the outer cylindrical body 151.

Front and rear dust covers 158, 159 each configured to prevent dust from entering the outer race 154 through a clearance between the front shaft 37*a* and the outer race 154 are provided respective on the front and rear sides of the bearing body 152.

In part of the front shaft 37*a* right in front of the center bearing 67, an inner pushing part 161 and an outer pushing part 162 each configured to push the center bearing 67 toward the rear when impact force from the front to the rear acts on the front shaft 37*a*. The inner pushing part 161 has the substantially same diameter as the diameter at a front end of the outer race 154, and pushes the outer race 154 toward the rear when impact force from the front to the rear acts on the front shaft 37*a*. On the other hand, the outer pushing part 162 has the substantially same diameter as that of the outer cylindrical body 151, and pushes the outer cylindrical body 151 toward the rear when impact force from the front to the rear acts on the front shaft 37*a*. Thus, impact force from the front to the rear acts on the center bearing 67. Consequently, if the impact force is greater than the reference value, the center bearing 67 moves backward relative to the bearing bracket 68 (fifth cross-member 15), and then is detached from the bearing bracket 68 (fifth cross-member 15).

The universal joint 65 includes the joint part 65*a* (see FIGS. 25-27), a front connection part 65*b* (see FIG. 27) to be connected to a rear end part of the front shaft 37*a*, and a rear connection part 65*c* (see FIGS. 25-27) connected to the rear shaft 37*a* through the joint part 65*a* and connected to a front end part of the rear shaft 37*b*.

The front connection part 65*b* is in a cylindrical shape, and the rear end part of the front shaft 37*a* is inserted into the front connection part 65*b*. The front connection part 65*b* and the rear end part of the front shaft 37*a* rotate together due to spline engagement, and are fixed together so as not to relatively move in a shaft length direction.

The rear connection part 65*c* is also in a cylindrical shape, and the front end part of the rear shaft 37*b* is inserted into the rear connection part 65*c*. The rear connection part 65*c* and the front end part of the rear shaft 37*b* rotate together due to spline engagement, and is relatively movable in the shaft length direction. That is, a collapse structure is employed, in which, when impact force (impact force detaching the center bearing 67 from the bearing bracket 68) from the front to the rear acts on the front shaft 37*a* (i.e., when the front shaft 37*a* receives the impact force), the connection part of the universal joint 65 and the rear shaft 37*b* is compressed in an axial direction of the rear shaft 37*b*. According to such a structure, when the front shaft 37*a* receives the impact force, the front shaft 37*a* and the universal joint 65 tend to move backward. At this point, since backward movement of the rear shaft 37b is restricted by an axle housing 132, the rear connection part 65c moves toward the rear relative to the front end part of the rear shaft 37b (the connection part of the universal joint 65 and the rear shaft 37b is compressed in the axis direction of the rear shaft 37b). That is, a distance between the joint part 65a and the universal joint 66 is shortened. This allows the movement of the front shaft 37a toward the rear. Then, the front shaft 37a (i.e., the inner pushing part 161 and the outer pushing part 162) pushes, as described above, the center bearing 67 toward the rear, thereby detaching the center bearing 67 from the bearing bracket 68. Note that the collapse structure is not limited to the connection part of the universal joint 65 and the rear shaft 37b, and may be provided at a position (e.g., a middle part of the rear shaft 37b) of the rear wheel propeller shaft 37 on the rear side relative to the center bearing 67.

Referring to FIGS. 25 and 26, the center bearing 67 and part of the fifth cross-member 15 on the right relative to the center bearing 67 (i.e., part of the fifth cross-member 15 on the side opposite to the fuel tank 83 which will be described later) are connected together through a connection wire 170 extending in the vehicle width direction. The connection wire 170 is a flexible connection body, the length of which is not substantially extended.

Specifically, an attachment fitting 171 is swaged to each end of the connection wire 170. The attachment fitting 171 at one end (left end) of the connection wire 170 is connected and fixed to a rear extension 151c of the right attachment part 151a of the outer cylindrical body 151 with a stud bolt 172 provided in the rear extension 151c and a nut 173 screwed into the stud bolt 172. The attachment fitting 171 at the other end (right end) of the connection wire 170 is connected and fixed to part of the fifth cross-member 15 on the side opposite to the fuel tank 83 relative to the center bearing 67 with a stud bolt 175 provided on the fifth cross-member 15 and a nut 176 screwed into the stud bolt 175. The length of the connection wire 170 including the attachment fitting 171 is longer than a distance between the stud bolts 172, 175. Thus, the connection wire 170 is loosened and is curved at a middle part thereof due to flexibility of the connection wire 170 (see FIGS. 24 and 25). This is to allow the center bearing 67 to move toward the rear until the center bearing 67 is detached from the bearing bracket 68 (fifth cross-member 15). That is, the connection wire 170 connects between the center bearing 67 and the fifth cross-member 15 in the state in which the connection wire 170 is loosened to allow the backward movement of the center bearing 67. When the center bearing 67 is detached from the bearing bracket 68 due to the backward movement caused when the center bearing 67 receives impact force from the front shaft 37a, the center bearing 67 can hardly move to the left (to the fuel tank 83 which will be described later) because of the connection wire 170, and then is dropped as described later.

Referring to FIG. 24, the rear differential gear unit 38 includes the axle housing 132 accommodating a differential gear etc. The axle housing 132 includes a gear accommodation part 132a accommodating the differential gear, a left drive shaft accommodation part 132b extending in the vehicle width direction and accommodating a left rear wheel drive shaft configured to drive the left rear wheel 7, a right drive shaft accommodation part 132c extending in the vehicle width direction and accommodating a right rear wheel drive shaft configured to drive the right rear wheel 7, and an input shaft accommodation part 132d connected to the rear shaft 37b and accommodating the input shaft extending in the vehicle length direction. Each of the drive shaft accommodation parts 132b, 132c is in a cylindrical shape so as to cover the periphery of the rear wheel drive shaft. One of the drive shaft accommodation parts 132b, 132c extends toward one side of the gear accommodation part 132a in the vehicle width direction, and the other one of the drive shaft accommodation parts 132b, 132c extends toward the other side of the gear accommodation part 132a in the vehicle width direction.

Each of the drive shaft accommodation parts 132b, 132c is supported by a leaf spring 71 attached to a rear part of the wide part 10b of the main frame 10 (see FIG. 14). A shock absorber 72 is arranged between the left drive shaft accommodation part 132b and part of the left main frame 10 on the rear relative to the left drive shaft accommodation part 132b, and another shock absorber 72 is arranged between the right drive shaft accommodation part 132c and part of the right main frame 10 on the front relative to the right drive shaft accommodation part 132c (see FIGS. 13, 14, and 24).

An exhaust device 75 of the engine 32 is arranged at the right of the engine 32 (see FIGS. 13 and 24). The exhaust device 75 includes an exhaust pipe 76 extending to the vicinity of a rear end of the vehicle 1. An upstream exhaust purification device 77, a flexible joint 78, a downstream exhaust purification device 79, and a muffler 80 are, in this order from an upstream side, attached to the exhaust pipe 76. Each of the upstream and downstream exhaust purification devices 77, 79 has a three-way catalyst, and purifies exhaust from the engine 32. Particularly in order to purify HC and CO from the engine 32 which is in a cold state, the upstream exhaust purification device 77 is arranged near the engine 32. The flexible joint 78 is configured to reduce transmission of vibration of the engine 32 to part of the exhaust pipe 76 downstream of the flexible joint 78. The muffler 80 is arranged at the right of the rear shaft 37b of the rear wheel propeller shaft 37 between the fifth and sixth cross-members 15, 16.

The fuel tank 83 made of resin and storing fuel to be supplied to the engine 32 is arranged at the left of the rear shaft 37b (see FIGS. 13, 14, and 24). The fuel tank 83 is basically positioned between the fifth and sixth cross-members 15, 16. Part of the fuel tank 83 positioned between the fifth and sixth cross-members 15, 16 is hereinafter referred to as a "tank body 83a." A front extension 83b extending toward the front beyond the fifth cross-member 15 through below the fifth cross-member 15 and arranged next to the center bearing 67 in the vehicle width direction is provided in the front of the tank body 83a. A rear extension 83c extending toward the rear beyond the sixth cross-member 16 through below the sixth cross-member 16 is provided in the rear of the tank body 83a. Thus, the fuel tank 83 is arranged between the center bearing 67 and the left main frame 10.

Part of the front extension 83b below the fifth cross-member 15 and part of the rear extension 83c below the sixth cross-member 16 are narrowed in the vehicle width direction. The fuel tank 83 is, at the foregoing two narrow parts, attached and fixed to lower surfaces of the fifth and sixth cross-members 15, 16 through band-shaped tank attachment members 84 (see FIG. 24). An insulator 85 (illustrated only in FIGS. 25 and 26) which is a thin steel plate for blocking heat from the exhaust pipe 76 and the muffler 80 is provided on a right side surface of the fuel tank 83. In addition, although not shown in the figure, an under guard which is a thin steel plate is provided on a lower surface of the fuel tank 83. Such an under guard is also provided in the following positions: a position below the engine 32; a position between the first and second cross-members; and a position below the power transfer unit 34.

The right and left front wheels 6 are steered by a steering mechanism operated in synchronization with a steering wheel operated by a passenger. In the steering mechanism, a pinion is rotated by operating the steering wheel, and a rack engaged with the pinion is accommodated in a steering gear box 87 (see FIGS. 13 and 15-18). The rack extends in the vehicle width direction, and is, at both ends thereof, attached to right and left steering rods 88 (see FIGS. 16 and 18). Each of the steering rods 88 is connected to a knuckle 91 provided in an inner part of the hub 50 in the vehicle width direction.

Referring to FIGS. 15-20, the right and left front wheels 6 are supported respectively by right and left front wheel suspension devices 90 (indicated by a reference number "90" only in FIG. 15). Each of the front wheel suspension devices 90 is a high mount type double wishbone suspension. Each of the front wheel suspension devices 90 includes the knuckle 91, a lower arm 92, an upper arm 93, a coil spring 94 (illustrated only in FIG. 20), and a shock absorber 95. Note that a stabilizer provided in the front wheel suspension device 90 is not shown in the figure.

The lower arm 92 is in such a shape that the lower arm 92 is branched into two front and rear parts in a base end part thereof (inner part thereof in the vehicle width direction). A front base end part 92*a* of the lower arm 92 is attached to the second cross-member 12 through the cross-member bracket 23, and a rear base end part 92*b* of the lower arm 92 is attached to the third cross-member 13 through the cross-member bracket 24. Specifically, the front base end part 92*a* is rotatably attached to a lower arm pivot 98 (see FIGS. 6 and 22) which is provided so as to extend in the vehicle length direction in the cross-member bracket 23, and the rear base end part 92*b* is rotatably attached to a lower arm pivot 99 (see FIGS. 6 and 22) which is provided so as to extend in the vehicle length direction in the cross-member bracket 24. This allows the lower arm 92 to vertically swing about the lower arm pivots 98, 99.

The upper arm 93 is in such a shape that the upper arm 93 is branched into two front and rear parts in a base end part thereof. A front base end part 93*a* of the upper arm 93 is rotatably attached to one end part of an upper arm pivot 106 (see FIGS. 15-17 and 19) which is provided so as to extend in the vehicle length direction in an inner panel 102 of a suspension tower 101 which will be described later, and a rear base end part 93*b* of the upper arm 93 is rotatably attached to the other end part of the upper arm pivot 106. This allows the upper arm 93 to vertically swing about the upper arm pivot 106.

The lower arm 92 outwardly extends from the front and rear base end parts 92*a*, 92*b* in the vehicle width direction relative to the main frame 10. The lower arm 92 is, in a tip end part thereof (outer end part thereof in the vehicle width direction), connected to a lower end part of the knuckle 91 through a ball joint 110 (see FIGS. 19 and 22). The upper arm 93 outwardly extends from the front and rear base end parts 93*a*, 93*b* in the vehicle width direction relative to the main frame 10. The upper arm 93 is, in a tip end part thereof (outer end part thereof in the vehicle width direction), connected to an upper end part of an arm part 91*a* upwardly extending toward an upper part of the knuckle 91 through a ball joint 111 (see FIGS. 15, 17, and 19). Thus, the knuckle 91, the lower arm 92, and the upper arm 93 vertically swing in synchronization with the vertical movement of the front wheel 6.

A bump stopper 115 (see FIGS. 2-6, 15, 17, and 19-23) is welded to an outer surface of the main frame 10 in the vehicle width direction. The bump stopper 115 is configured to contact a contact part 92*c* provided near the rear base end part 92*b* on an upper surface of the lower arm 92 and restrict upward movement of the lower arm 92 beyond a position where the bump stopper 115 and the contact part 92*c* contact each other. The lower arm 92 is formed by two upper and lower plate members 92*d*, 92*e* (a space is formed between the plate members 92*d*, 92*e*), and another plate member 92*f* is welded to the contact part 92*c* in order to increase the strength of the contact part 92*c* (see FIG. 22).

Each of the bump stoppers 115 includes a stopper body 116 attached to the outer surface of the main frame 10 in the vehicle width direction so as to outwardly protrude in the vehicle width direction. The stopper body 116 is a panel which is formed in a bag shape (in the present embodiment, a substantially U-shape) opening on the inner side in the vehicle width direction as viewed in a cross section along the horizontal direction and which opens at both of upper and lower ends. End parts of the panel at sides of the opening on the inner side in the vehicle width direction (end parts of the U-shape as viewed in the cross section), i.e., a front attachment part 116*c* and a rear attachment part 116*d* (see FIGS. 6, 22, and 23) of the stopper body 116, are attached to the outer surface of the main frame 10 in the vehicle width direction with the end parts of the panel being apart from each other in the vehicle length direction. That is, the stopper body 116 is attached to the main frame 10 at the end parts of the U-shape as viewed in the cross section (at the front and rear attachment parts 116*c*, 116*d*).

The opening of the stopper body 116 at the upper end of the panel is hereinafter referred to as an "upper opening 116*a*," and the opening of the stopper body 116 at the lower end of the panel is hereinafter referred to as a "lower opening 116*b*." Since the stopper body 116 is attached to the main frame 10 at the front and rear attachment parts 116*c*, 116*d*, the opening of the panel on the inner side in the vehicle width direction is closed, and the stopper body 116 and part of the main frame 10 together form a vertically-extending cylindrical shape which opens at both of upper and lower ends in the vertical direction. The openings at the upper and lower ends in the vertical direction are the upper opening 116*a* and the lower opening 116*b*, respectively. Thus, it can be said that the upper opening 116*a* is formed between an upper end part of the stopper body 116 and the outer surface of the main frame 10 in the vehicle width direction. In addition, it can be said that the lower opening 116*b* is formed between a lower end part of the stopper body 116 and the outer surface of the main frame 10 (specifically the cross-member bracket 24) in the vehicle width direction.

In the present embodiment, the amount of outward protrusion of the stopper body 116 from the main frame 10 in the vehicle width direction is gradually increased toward the bottom of the stopper body 116. Thus, as viewed in the vehicle length direction, a tip end of the stopper body 116 is downwardly inclined toward the outer side in the vehicle width direction. An opening area of the lower opening 116*b* is larger than that of the upper opening 116*a*.

Of the upper opening 116*a* and the lower opening 116*b*, only the lower opening 116*b* is covered by a closing member 117 (see FIGS. 4, 6, 22, and 23). A contact member 118 contacting the lower arm 92 is attached to an outer part of a lower surface of the closing member 117 in the vehicle width direction. Specifically, referring to FIG. 23, the contact member 118 includes an inverted dish-shaped base 118*a* fixed to the closing member 117, and a rubber contact part 118*b* vulcanized and bonded to the base 118*a* and formed in a downwardly-pointing conical shape. The contact part 92*c* of the lower arm 92 contacts the rubber contact part 118*b*. A stud bolt 119 is welded to a center part of the base 118*a* so as to upwardly protrude, and a weld nut 120 into which the stud bolt 119 is screwed is welded to an upper surface of the closing member 117. A through-hole 117*a* is formed in a position of the closing member 117 corresponding to the weld nut 120 (see FIGS. 6 and 23). When the contact member 118 is attached to the lower surface of the closing member 117, the stud bolt 119 is inserted into the through-hole 117a, and then the base 118a is rotated. In such a manner, the stud bolt 119 is screwed into the weld nut 120.

The rear attachment part 116d of the stopper body 116 is, in a position where the rear attachment part 116d and the third cross-member 13 overlap with each other in the vehicle length direction, attached to a part extending from an upper end to a lower end in the outer surface of the main frame 10 in the vehicle width direction and to the third cross-member 13 (specifically the cross-member bracket 24). In addition, the front attachment part 116c of the stopper body 116 is, in a position between the engine mount bracket 27 and the third cross-member 13 in the vehicle length direction, attached to a part extending from the upper end to the lower end in the outer surface of the main frame 10 in the vehicle width direction.

The lower arm 92 is, in the vicinity of the rear base end part 92b (part of the lower arm 92 contacting the contact member 118), forwardly inclined toward the outer side in the vehicle width direction. Thus, in accordance with such a shape, the stopper body 116 and the contact member 118 protrude from the outer surface of the main frame 10 in the vehicle width direction toward the outer side in the vehicle width direction in the state in which the stopper body 116 and the contact member 118 are forwardly inclined toward the outer side in the vehicle width direction.

The configuration and arrangement of the bump stopper 115 allows the bump stopper 115 to be easily compressed and deformed in the vehicle length direction upon the frontal collision of the vehicle 1. Thus, the bump stopper 115 does not prevent the compression deformation of the main frame 10 in the vehicle length direction upon the frontal collision of the vehicle. In the present embodiment, in positions (one of the positions is in an upper surface and the other position is in the lower surface) of the main frame 10 overlapping with the upper opening 116a in the vehicle length direction, a plurality of recessed parts 125 (two recessed parts 125) (see FIGS. 4, 7, 8, 15, and 20) are respectively formed (the recessed part formed in the lower surface of the main frame 10 is not shown in the figure). The plurality of recessed parts 125 allow the main frame 10 to be more easily compressed and deformed in the vehicle length direction. In addition, since the front attachment part 116c of the stopper body 116 of the bump stopper 115 does not overlap with the engine mount bracket 27 in the vehicle length direction, advantages similar to those in an later-described arrangement in which a plurality of deformation preventing members are dispersively arranged can be realized. The recessed parts 125 may be formed in any positions of the main frame 10 as long as such positions overlap with the upper opening 116a in the vehicle length direction. The recessed parts 125 are not necessarily formed respectively in multiple positions, and the recessed part 125 may be formed only in a single position. Even if a small hole penetrating the inner panel 20 or the outer panel 21 is formed instead of forming the recessed part 125, it is expected that the similar advantages can be realized. In such a case, the small hole functions as a hole which is required for taking an electrodeposition solution in and out of the closed space of the main frame 10 at a step of coating the main frame.

The suspension tower 101 configured to support a top part of a vertically-extending strut 96 (i.e., the coil spring 94 and the shock absorber 95) of the front wheel suspension device 90 is attached to part of the narrow part 10a of the main frame 10 between the second and third cross-members 12, 13 (see, e.g., FIGS. 6-8, 10-12, 15-17, and 19). A lower end part of the strut 96 (lower end part of the shock absorber 95) is connected to the lower arm 92 so as to rotate about an axis extending in the vehicle length direction.

Figure 10:
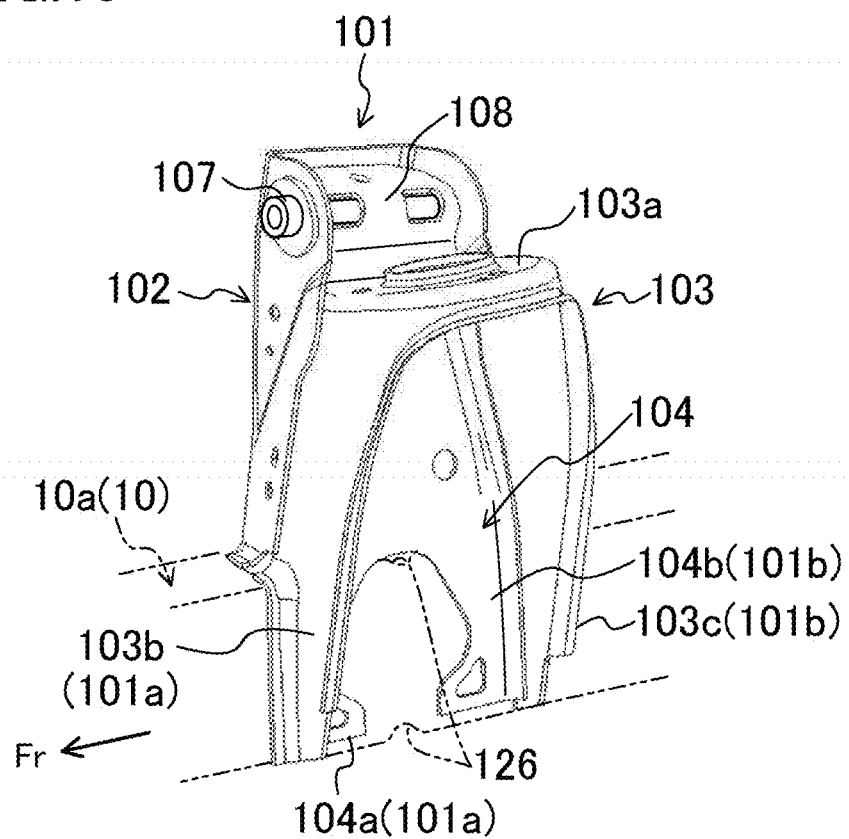
FIG. 10 is a perspective view illustrating the suspension tower of the left main frame.
Figure 11:
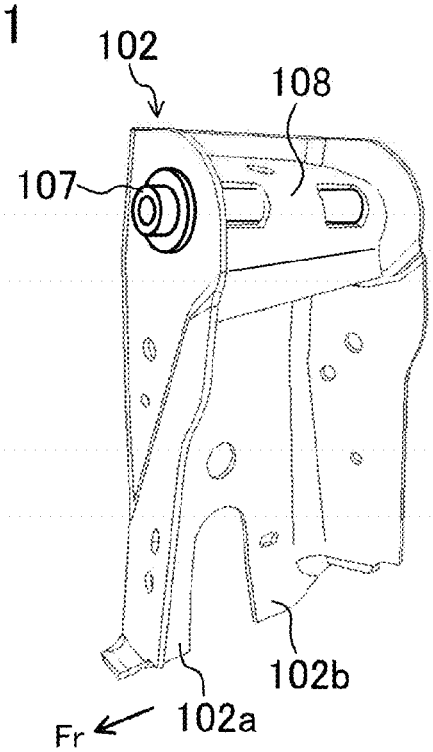
FIG. 11 is a perspective view illustrating an inner panel and a stiffener of the suspension tower illustrated in FIG. 10.
Figure 12:
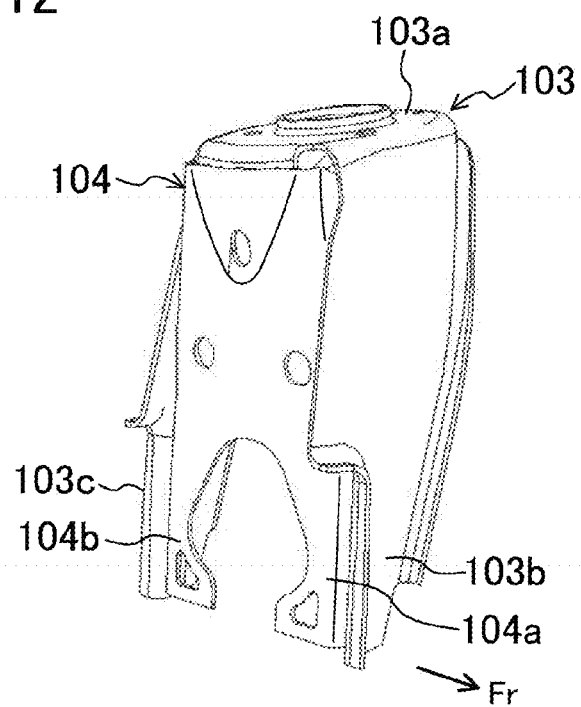
FIG. 12 is a perspective view illustrating an outer panel and a suspension tower reinforcement of the suspension tower illustrated in FIG. 10.

The suspension tower 101 includes the inner panel 102 positioned on the inner side in the vehicle width direction, an outer panel 103 connected to the inner panel 102 and positioned on the outer side in the vehicle width direction, and a suspension tower reinforcement 104 provided between the panels 102, 103 (see, e.g., FIGS. 10-12). In a lower part of the suspension tower 101, a front leg part 101a and a rear leg part 101b are provided so as to be branched and be separated from each other in the vehicle length direction.

Specifically, a strut receiving part 103a configured to support the top part of the strut 96 is formed in an upper end part of the outer panel 103. Top parts of the coil spring 94 and the shock absorber 95 are fixed to the strut receiving part 103a and are supported by the strut receiving part 103a. The outer panel 103 includes an outer panel front leg part 103b downwardly extending from an upper front end part of the outer panel 103, and an outer panel rear leg part 103c downwardly extending from an upper rear end part of the outer panel 103.

The suspension tower reinforcement 104 is welded to the outer panel 103 so as to cover an opening of the outer panel 103 between the outer panel front leg part 103b and the outer panel rear leg part 103c on the inner side in the vehicle width direction. A space surrounded by the outer panel front leg part 103b, the outer panel rear leg part 103c, and the suspension tower reinforcement 104 and opening on the outer side in the vehicle width direction is a space accommodating the strut 96. Note that, instead of providing the suspension tower reinforcement 104, the outer panel 103 may be integrally formed to fill a part corresponding to the suspension tower reinforcement 104.

The outer panel 103 to which the suspension tower reinforcement 104 is welded is welded to the inner panel 102. In such a welded state, a closed space is, as viewed in the cross section, formed between the inner panel 102 and the suspension tower reinforcement 104. If the outer panel 103 is integrally formed to fill the part corresponding to the suspension tower reinforcement 104, a closed space is, as viewed in the cross section, formed between the inner panel 102 and the outer panel 103.

In the foregoing welded state, the inner panel 102 upwardly protrudes relative to the outer panel 103, and the outer panel 103 downwardly protrudes relative to the inner panel 102. In the upwardly-protruding part of the inner panel 102, the upper arm pivot 106 configured to support the upper arm 93 is provided so as to extend in the vehicle length direction. The upper arm pivot 106 is inserted into a support sleeve 107 (see FIGS. 10 and 11) provided in the inner panel 102. A stiffener 108 (see FIGS. 10 and 11) is provided on an outer side of the support sleeve 107 in the vehicle width direction (in a position above the outer panel 103), and reinforces part of the inner panel 102 where the upper arm pivot 106 is provided. The reason why the upper arm pivot 106 is provided in the inner panel 102 is that the length of the upper arm 93 can be longer than that in the case where the upper arm pivot 106 is provided in the outer panel 103.

In a lower part of the inner panel 102, an inner panel front leg part 102a and an inner panel rear leg part 102b are provided so as to be branched and be separated from each other in the vehicle length direction. In the lower part of the suspension tower reinforcement 104, a reinforcement front leg part 104a and a reinforcement rear leg part 104b are provided so as to be branched and be separated from each other in the vehicle length direction. The reinforcement front leg part 104*a* is welded to the outer panel front leg part 103*b*, and the reinforcement rear leg part 104*b* is welded to the outer panel rear leg part 103*c*.

The inner panel front leg part 102*a*, the outer panel front leg part 103*b*, and the reinforcement front leg part 104*a* together form the front leg part 101*a* of the suspension tower 101. The inner panel rear leg part 102*b*, the outer panel rear leg part 103*c*, and the reinforcement rear leg part 104*b* together form the rear leg part 101*b* of the suspension tower 101.

The front leg part 101*a* and the rear leg part 101*b* of the suspension tower 101 are welded to the main frame 10 so as to be separated from each other in the vehicle length direction. Specifically, the inner panel front leg part 102*a* and the inner panel rear leg part 102*b* of the inner panel 102 are welded to an inner part of an upper surface of the main frame 10 in the vehicle width direction (to the inner panel 20 of the main frame 10) so as to be separated from each other in the vehicle length direction. The outer panel front leg part 103*b* and the outer panel rear leg part 103*c* of the outer panel 103 are welded to an outer part of the upper surface of the main frame 10 in the vehicle width direction and to a part extending from the upper end to the lower end in the outer surface of the main frame 10 in the vehicle width direction (to the outer panel 21 of the main frame 10) so as to be separated from each other in the vehicle length direction. The reinforcement front leg part 104*a* and the reinforcement rear leg part 104*b* of the suspension tower reinforcement 104 are welded to the outer surface of the main frame 10 in the vehicle width direction (to the outer panel 21 of the main frame 10) so as to be separated from each other in the vehicle length direction. Thus, the lower part of the suspension tower 101 is not attached to the main frame 10 across the entirety of the lower part of the suspension tower 101 in the vehicle length direction, but a middle lower part of the suspension tower 101 in the vehicle length direction is not attached to the main frame 10. As described above, even if the lower part of the suspension tower 101 is attached to the main frame 10 at the front leg part 101*a* and the rear leg part 101*b*, the suspension tower 101 is, on the inner side in the vehicle width direction, attached to the main frame 10 at the inner panel front leg part 102*a* and the inner panel rear leg part 102*b*, and is, on the outer side in the vehicle width direction, attached to the main frame 10 at the outer panel front leg part 103*b*, the outer panel rear leg part 103*c*, the reinforcement front leg part 104*a*, and the reinforcement rear leg part 104*b*. Thus, the attachment strength of the suspension tower 101 to the main frame 10 can sufficiently withstand force received from the strut 96.

A plurality of recessed parts 126 (four recessed parts 126) (see FIGS. 6-9 and 20-22) are formed in part of the main frame 10 between the front leg part 101*a* and the rear leg part 101*b* (in the total of four parts which are a corner part formed between the upper surface of the main frame 10 and one of side surfaces of the main frame 10, a corner part between the upper surface of the main frame 10 and the other side surface of the main frame 10, a corner part formed between the lower surface of the main frame 10 and one of the side surfaces of the main frame 10, and a corner part formed between the lower surface of the main frame 10 and the other side surface of the main frame 10). The plurality of recessed parts 126 allow the main frame 10 to be easily compressed and deformed in the vehicle length direction at the recessed parts 126 upon the frontal collision of the vehicle 1 (particularly upon a full-wrap frontal collision of the vehicle 1). That is, a connection part of the main frame 10 and the suspension tower 101 (attachment part of the main frame 10 and the suspension tower 101) is typically less likely to be compressed and deformed in the vehicle width direction. However, since the suspension tower 101 is attached to the main frame 10 at the front leg part 101*a* and the rear leg part 101*b* branched to be separated from each other in the vehicle length direction, the main frame 10 can be, at part thereof between the front leg part 101*a* and the rear leg part 101*b*, easily compressed and deformed in the vehicle length direction upon the frontal collision of the vehicle 1. In addition, since the recessed parts 126 are formed in the foregoing part, the main frame 10 can be more easily compressed and deformed in the vehicle length direction at the foregoing part. Note that the recessed parts 126 may be formed in any part of the main frame 10 between the front leg part 101*a* and the rear leg part 101*b*. In addition, the recessed parts 126 are not necessarily formed respectively in multiple positions, and the recessed part 126 may be formed in a single position.

The second cross-member 12 is provided in a position apart from the suspension tower 101 toward the front. In addition, the third cross-member 13 is provided in a position apart from the suspension tower 101 toward the rear.

The engine mount bracket 27 is provided so as to be, in the vehicle length direction, apart from the connection part of the main frame 10 and the suspension tower 101, a connection part of the main frame 10 and the second cross-member 12 (connection part of the main frame 10 and the cross-member bracket 23), and a connection part of the main frame 10 and the third cross-member 13 (connection part of the main frame 10 and the cross-member bracket 24). In addition, the engine mount bracket 27 is welded to part of the inner surface of the main frame 10 in the vehicle width direction (to part of the inner panel 20 of the main frame 10) between the second and third cross-members 12, 13.

Providing the engine mount bracket 27 apart from each of the foregoing connection parts in the vehicle length direction includes providing the engine mount bracket 27 apart from each of the foregoing connection parts in the vehicle length direction at the same height position of the main frame 10. Referring to, e.g., FIG. 9, the engine mount bracket 27 is forwardly inclined toward the bottom at a front end thereof. At a height position in the upper part of the main frame 10, an upper front end part of the engine mount bracket 27 is positioned apart from the rear leg part 101*b* of the suspension tower 101 in the vehicle length direction. A lower front end part of the engine mount bracket 27 is positioned apart from the rear leg part 101*b* in the vertical direction. That is, the engine mount bracket 27 is, at the front end thereof, forwardly inclined toward the bottom such that a clearance having a predetermined width is formed between the engine mount bracket 27 and the suspension tower 101 (rear leg part 101*b*). As will be described later, the main frame 10 is, at the foregoing clearance, compressed and deformed in the vehicle length direction.

In the present embodiment, the engine mount bracket 27 is attached to part of the main frame 10 between the suspension tower 101 and the third cross-member 13. In such a case, since the engine 32 can be arranged in a position relatively closer to the rear in a front part of the main frame 10, timing of backward movement of the engine 32 upon the front collision of the vehicle 1 can be delayed. As a result, the amount of energy absorbed by the compression deformation of the front part of the main frame 10 before the engine 32 begins to move backward can be increased.

The engine mount bracket 27 may be attached to part of the main frame 10 between the suspension tower 101 and the second cross-member 12. In such a case, it is also preferred that the engine mount bracket 27 is attached to the main frame 10 so as to be apart from the connection part of the main frame 10 and the suspension tower 101, the connection part of the main frame 10 and the second cross-member 12, and the connection part of the main frame 10 and the third cross-member 13 in the vehicle length direction. Note, however, that the engine 32 is likely to be arranged in a position relatively closer to the front in the front part of the main frame 10, and therefore the timing of the backward movement of the engine 32 upon the frontal collision of the vehicle 1 is advanced. As a result, the amount of energy absorbed by the compression deformation of the main frame 10 at the front part thereof before the engine 32 begins to move backward is decreased. Thus, engineering for energy absorption is required, which takes into account the backward movement of the engine 32 having an unstable behavior.

Figure 28:
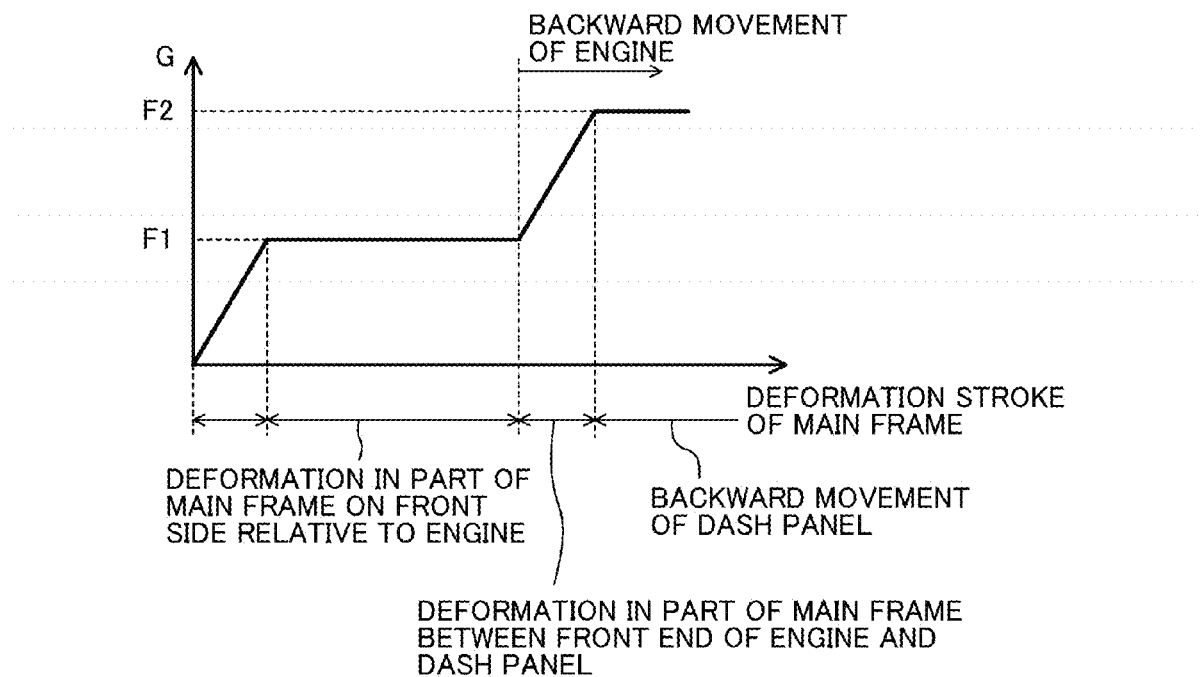
FIG. 28 is a graph illustrating a relationship between a compression deformation stroke (the amount of entry of an obstacle into the vehicle upon a frontal collision between the obstacle and the vehicle) and impact force G acting on a cabin upon the frontal collision of the vehicle.

Upon the full-wrap frontal collision of the vehicle 1, impact force toward the rear is applied to the entirety of the front bumper 5 and the first cross-member 11 in the vehicle width direction. Thus, referring to FIG. 28, impact force G acting on the cabin 3 is increased to F1.

Subsequently, each of the right and left main frames 10 is compressed and deformed in the vehicle length direction (length direction of the main frame 10) at part thereof between the first and second cross-members 11, 12. At this point, the impact force G is F1.

Then, each of the main frames 10 is compressed and deformed in the vehicle length direction at the following parts in the order described below: part of the main frame 10 between the second cross-member 12 and the suspension tower 101; part of the main frame 10 between the front leg part 101a and the rear leg part 101b of the suspension tower 101 (part of the main frame 10 where the recessed parts 126 are formed); part of the main frame 10 between the suspension tower 101 and the engine mount bracket 27; and part of the main frame 10 between the engine mount bracket 27 and the third cross-member 13 (this part includes the bump stopper 115). In parallel with the compression deformation of the main frame 10 at the foregoing parts, the engine 32 moves backward, and then the dash panel 29 is deformed toward the rear by the backwardly-moving engine 32 (the dash panel 29 moves backward while being deformed). When the engine 32 begins to move backward, the impact force G is increased from F1, and reaches F2 when the deformation (movement) of the dash panel 29 toward the rear begins due to the backward movement of the engine 32.

A value for F2 significantly varies depending on the amount of compression deformation of the main frame 10 in the vehicle length direction. A larger compression deformation amount results in a smaller value for F2. However, the various deformation preventing members preventing the compression deformation of the main frame 10 in the vehicle length direction upon the frontal collision of the vehicle 1, such as the second and third cross-members 12, 13, the suspension tower 101, and the engine mount bracket 27, are attached to part of the main frame 10 between the second and third cross-members 12, 13. Since the bump stopper 115 is, as described above, formed in such a shape that the bump stopper 115 is easily compressed and deformed in the vehicle length direction, the bump stopper 115 is not considered as the deformation preventing members.

It can be considered that the plurality of deformation preventing members are arranged so as to overlap with each other in the vehicle length direction. However, in such a configuration, the main frame 10 is much less likely to be compressed and deformed in the vehicle length direction at an attachment part of each of the deformation preventing members and the main frame 10. Thus, it can be considered that the value for F2 is instantaneously and excessively increased.

In the present embodiment, the engine mount bracket 27 is attached to the main frame 10 so as to be apart from the connection part of the main frame 10 and the suspension tower 101, the connection part of the main frame 10 and the second cross-member 12, and the connection part of the main frame 10 and the third cross-member 13. That is, the plurality of deformation preventing members are arranged so as to be dispersed in the vehicle length direction on the main frame 10, and therefore it is ensured that the main frame 10 is compressed and deformed in the vehicle length direction at part of the main frame 10 between adjacent ones of the deformation preventing members.

Unlike the case where the plurality of deformation preventing members are arranged so as to overlap with each other in the vehicle length direction, the main frame 10 cannot be compressed and deformed at all in the vehicle length direction at the attachment part of each of the deformation preventing members and the main frame 10, but can be compressed and deformed to some extent. Particularly in the present embodiment, the front leg part 101a and the rear leg part 101b branched so as to be separated from each other in the vehicle length direction are provided in the lower part of the suspension tower 101. In addition, and lower parts of the front leg part 101a and the rear leg part 101b are attached to the main frame 10 so as to be separated from each other in the vehicle length direction, and the recessed parts 126 are formed in part of the main frame 10 between the front leg part 101a and the rear leg part 101b. Thus, it is ensured that the main frame 10 is compressed and deformed in the vehicle length direction at part of the main frame 10 between the front leg part 101a and the rear leg part 101b. Further, the engine mount bracket 27 is likely to be compressed and deformed in the vehicle length direction due to the formation of the notch 27d, and it is highly likely that the main frame 10 is, in combination with the elongated hole 128 formed in the main frame 10, compressed and deformed in the vehicle length direction at the attachment part of the main frame 10 and the engine mount bracket 27. Thus, the total compression deformation at multiple positions allows the following: the amount of collision energy absorbed upon the frontal collision of the vehicle 1 can be ensured; and an instantaneous action of excessive impact force on the cabin 3 can be reduced. In addition, since the plurality of points at each of which it is ensured that the main frame 10 is compressed and deformed in the vehicle length direction are dispersively positioned, the impact force G can be easily controlled.

Upon the full-wrap frontal collision, when the engine 32 moves backward, the transmission 33 and the power transfer unit 34 also move backward (i.e., a power plant including the engine 32, the transmission 33, and the power transfer unit 34 moves backward), and impact force from the front to the rear acts on the front shaft 37a. Thus, the center bearing 67 is pushed to the rear by the inner pushing part 161 and the outer pushing part 162, and the impact force from the front to the rear acts on the center bearing 67. If the impact force is greater than the reference value (i.e., if the engine 32 greatly moves backward), the rear connection part 65c of the universal joint 65 moves to the rear relative to the front end part of the rear shaft 37b while the front shaft 37a and the center bearing 67 move backward (see FIG. 29).

Due to the backward movement of the center bearing 67, the center bearing 67 is detached from the bearing bracket 68 (fifth cross-member 15). At this point, pressing force P1 from the front connection part 65b acts on the joint part 65a of the universal joint 65, and receives pressing force P2 from the rear connection part 65c as counterforce. Due to the position (displaced from the center of the vehicle 1 in the vehicle width direction toward the right) of the input shaft of the rear differential gear unit 38 in the vehicle width direction, the rear wheel propeller shaft 37 is, as viewed in the plane, bent at the joint part 65a such that joint part 65a is positioned on the left (positioned on a side closer to the fuel tank 83) relative to the straight line connecting both ends of the rear wheel propeller shaft 37 (the front end of the front shaft 37a and the rear end of the rear shaft 37b). Thus, the resultant P3 of the pressing force P1 and P2 acts on the joint part 65a so as to move the joint part 65a to the left. The resultant P3 causes the universal joint 65, the center bearing 67, and part of the front shaft 37a near the center bearing 67 to move to the left (toward the fuel tank 83).

However, in the present embodiment, tension corresponding to the resultant P3 acts on the connection wire 170, thereby preventing the foregoing movement. In such a state, gravity which is not rapidly-acting force and is smaller than the pressing force P1 and P2 and the resultant P3 acts on the center bearing 67, the universal joint 65, and the front and rear shafts 37a, 37b. As a result, after the center bearing 67 slightly moves to the left by the amount of a change in tension from the loose state of the connection wire 170, the center bearing 67 begins to drop. Even if the connection wire 170 is changed from the loose state to the stretched state, the length of the connection wire 170 including the attachment fitting 171 is not substantially extended (i.e., is not substantially changed). Upon the dropping of the center bearing 67, the center bearing 67 is suspended by the fifth cross-member 15 through the connection wire 170, and therefore the center bearing 67 does not enter an area on the left (on the right side as viewed in FIG. 30) relative to a trail (i.e., a line L indicated by a dashed line in FIG. 30) of an end part (left attachment part 151a) of the center bearing 67 in the state in which the connection wire 170 is stretched. That is, the length of the connection wire 170 including the attachment fitting 171 is, in the state in which the connection wire 170 is stretched, set so as to be shorter than a distance at which the end part (left attachment part 151a) of the center bearing 67 reaches the fuel tank 83. Thus, the connection wire 170 is set to have a length at which the center bearing 67 detached from the fifth cross-member 15 does not reach the fuel tank 83.

Figure 29:
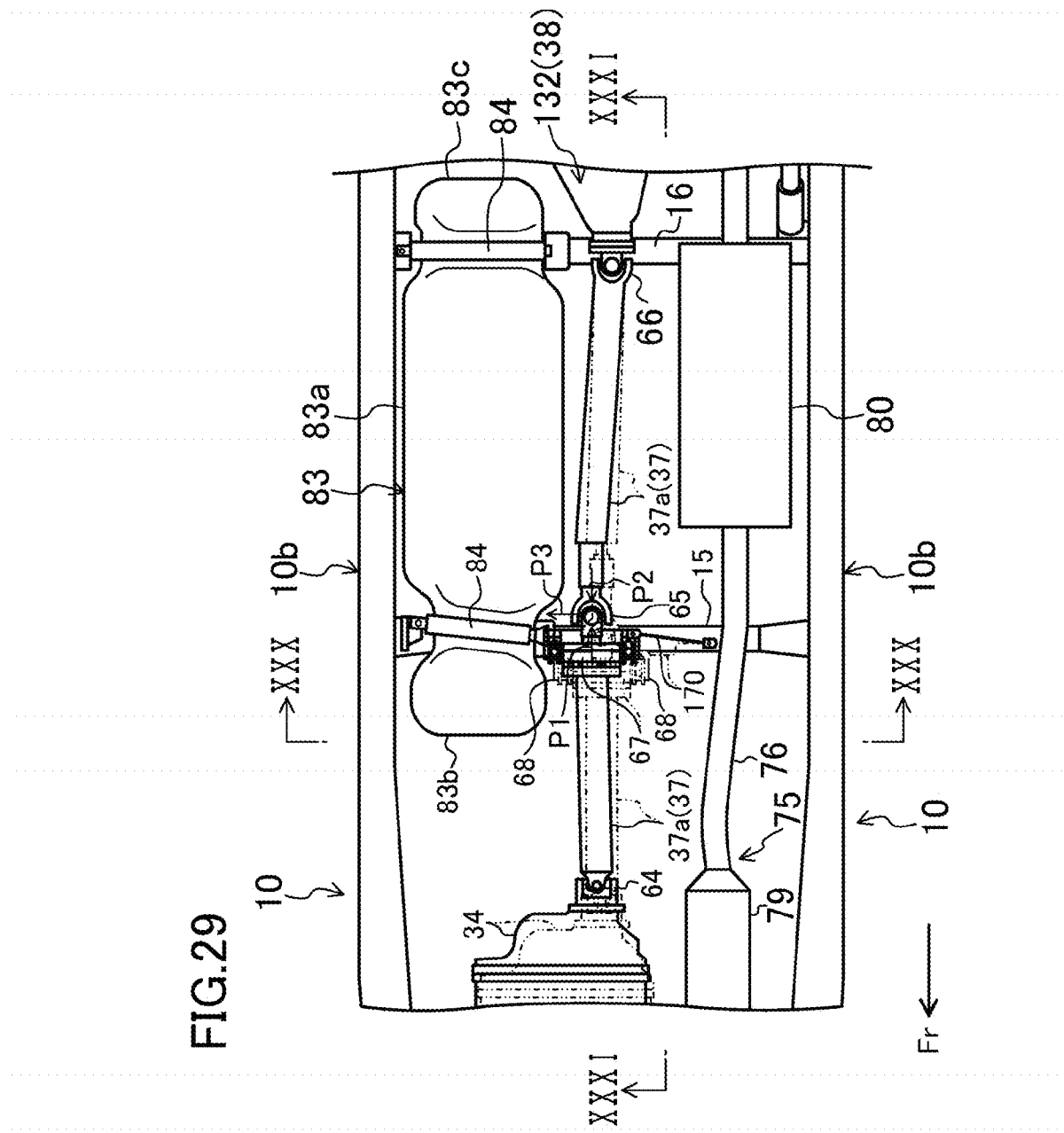
FIG. 29 is a bottom view illustrating the state in which the propeller shaft center bearing is detached from the fifth cross-member.
Figure 30:
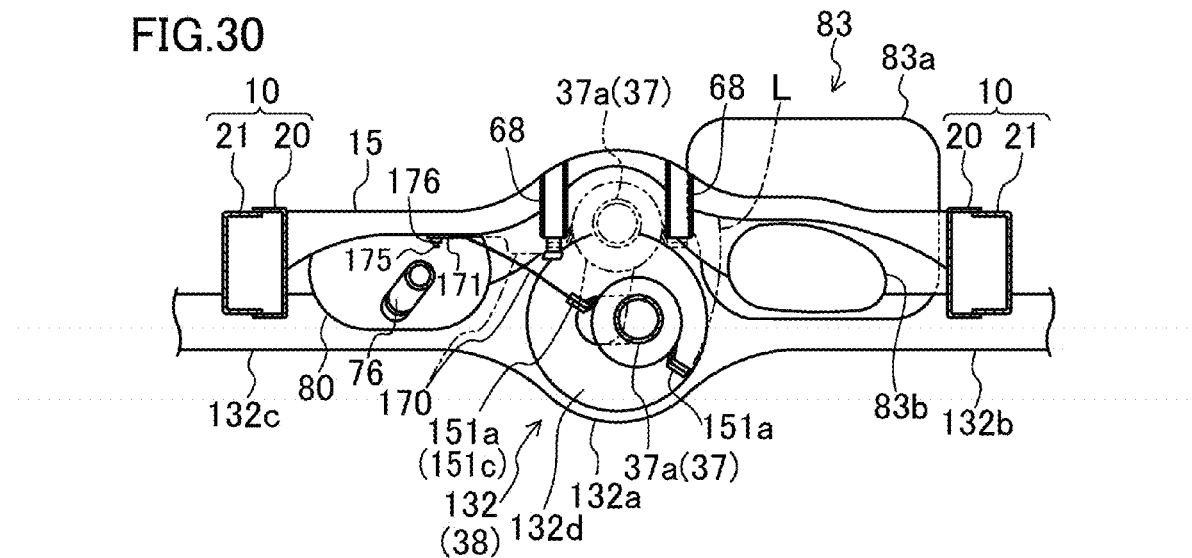
FIG. 30 is a cross-sectional view along an XXX-XXX line illustrated in FIG. 29.
Figure 31:
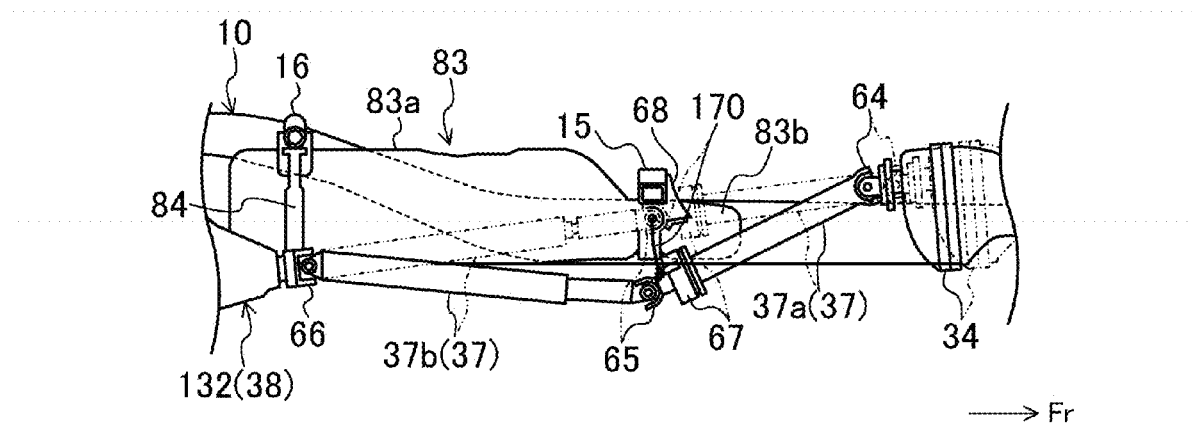
FIG. 31 is a cross-sectional view along an XXXI-XXXI line illustrated in FIG. 29.

Referring to FIG. 31, due to the dropping of the rear wheel propeller shaft 37, the rear wheel propeller shaft 37 is, as viewed from the side of the vehicle 1, bent at the joint part 65a such that joint part 65a is positioned below the straight line connecting both ends of the rear wheel propeller shaft 37. In FIGS. 29-31, the state of the front shaft 37a, the rear shaft 37b, the universal joint 65, etc. after the collision is indicated by a solid line, and the state before the collision is indicated by a chain double-dashed line. In addition, in FIGS. 29-31, the main frame 10, the fifth cross-member 15, the mounted components, etc. are drawn in a simplified shape.

Figure 32:
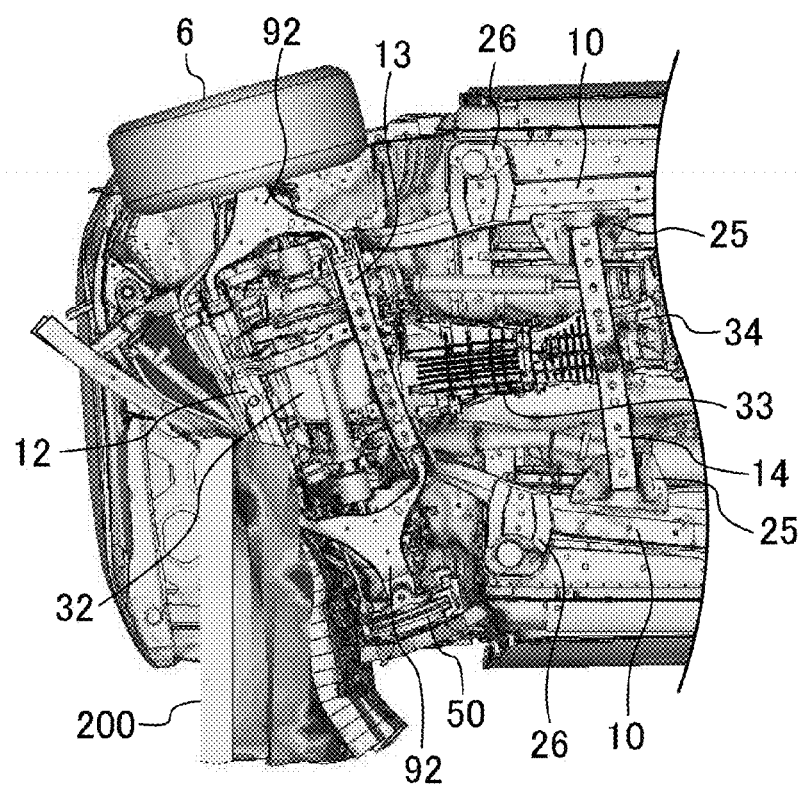
FIG. 32 is a bottom view of the vehicle illustrating a state of a front part of the vehicle upon an offset frontal collision of the vehicle.

As in the full-wrap frontal collision, the main frame 10 on a collided side is compressed and deformed in the vehicle length direction upon an offset frontal collision of the vehicle 1. However, referring to FIG. 32, the second and third cross-members 12, 13, the engine 32, the front wheel drive shaft 47, etc. do not move straight toward the rear, and such components on the collided side greatly moves toward the rear as compared to the components on a non-collided side. There is a possibility that the front wheel 6 (hub 50) on the collided side pushes the main frame 10 on the collided side toward the inner side in the vehicle width direction. Note that a reference numeral "200" in FIG. 32 represents an obstacle collided with the vehicle 1 at the front thereof.

Upon the offset frontal collision, a front part of the wide part 10b of the main frame 10 is highly likely to be deformed toward the inner side in the vehicle width direction due to pressing by the front wheel 6 (hub 50). Thus, as described in Patent Document 1 (Japanese Patent No. 2944198), if one end of the connection wire 170 connected to the center bearing 67 at the other end is connected to the front part of the wide part 10b of one (the main frame 10 apart from the fuel tank 83) of the main frames 10 arranged respectively on the right and left sides of the rear wheel propeller shaft 37, there is a possibility that a function to guide the bending of the rear wheel propeller shaft 37 by the connection wire 170 is not adequately fulfilled.

In the present embodiment, the one end of the connection wire 170 connected to the center bearing 67 at the other end is connected to the fifth cross-member 15 to which the center bearing 67 is attached. When the center bearing 67 receives impact force greater than the reference value, the center bearing 67 is detached from the fifth cross-member 15, and therefore the great impact force does not act on the fifth cross-member 15. A connection position of the main frame 10 and the fifth cross-member 15 is spaced a large distance behind a position where the hub 50 etc. are collided upon the offset frontal collision. As a result, the fifth cross-member 15 is hardly deformed even upon the full-wrap frontal collision or the offset frontal collision. Thus, the one end of the connection wire 170 connected to the center bearing 67 at the other end is connected to the fifth cross-member 15 to which the center bearing 67 is attached, and therefore the function to guide the bending of the rear wheel propeller shaft 37 by the connection wire 170 is further ensured. Consequently, the universal joint 65, the center bearing 67, and the part of the front shaft 37a near the center bearing 67 can be prevented from moving toward the fuel tank 83.

The present invention is not limited to the foregoing embodiment, and replacements can be made without departing from the main features of the invention.

For example, in the foregoing embodiment, the rear wheel propeller shaft 37 is, as viewed in the plane, bent at the joint part 65a such that the joint part 65a is positioned on the left relative to the straight line connecting both ends of the rear wheel propeller shaft 37. However, the rear wheel propeller shaft 37 may be, as viewed in the plane, bent at the joint part 65a such that the joint part 65a is positioned on the right relative to the straight line connecting both ends of the rear wheel propeller shaft 37. Alternatively, the entirety of the rear wheel propeller shaft 37 may extend straight in the vehicle length direction as viewed in the plane.

The foregoing embodiment has been set forth merely for purposes of preferred examples in nature, and the scope of the invention is not limited to such an embodiment. The scope of the present invention is defined by the appended claims, and modifications and changes within the equivalent range of the claims are regarded to be within the scope of the present invention.

INDUSTRIAL APPLICABILITY

The present invention is useful for the vehicle (particularly a small truck, a SUV, etc.) in which the propeller shaft center bearing configured to rotatably support the propeller shaft is attached to the chassis frame.

DESCRIPTION OF REFERENCE CHARACTERS

1 Vehicle
9 Chassis Frame
10 Main Frame

15 Fifth Cross-Member (Cross-Member to which Center Bearing is Attached)
37 Rear Wheel Propeller Shaft
37*a* Front Shaft
37*b* Rear Shaft
65 Universal Joint
67 Center Bearing
76 Exhaust Pipe
83 Fuel Tank
83*b* Front Extension
170 Connection Wire (Connection Body)

The invention claimed is:

1. An attachment structure of a propeller shaft to a cross-member in a vehicle, the structure comprising:
a pair of main frames extending in a vehicle length direction;
the cross-member connecting the main frames together;
the propeller shaft arranged between the main frames and including a front shaft and a rear shaft connected together through a joint;
a center bearing fixed to the cross-member and configured to rotatably support the front shaft;
a fuel tank arranged between the center bearing and one of the main frames; and
a flexible connection body configured to connect the center bearing and part of the cross-member on a side opposite to the fuel tank and having a length which is substantially non-extendable.

2. The structure of claim 1, wherein
the fuel tank is fixed to the cross-member.

3. The structure of claim 1, wherein
the center bearing includes an attachment part fixed to the cross-member, and
the attachment part is in such a shape that the attachment part can approach the cross-member from a rear side of the vehicle and can reach a fixing position thereof.

4. The structure of claim 1, wherein
the propeller shaft is, as viewed in plane, bent at the joint such that the joint is positioned on a side closer to the fuel tank relative to a straight line connecting front and rear ends of the propeller shaft.

5. The structure of claim 1, wherein
the center bearing is attached to the cross-member so as to be detached from the cross-member by backward movement of the center bearing due to impact force received from the front shaft, and
the connection body is set to have a length at which the center bearing detached from the cross-member is unable to reach the fuel tank.

6. The structure of claim 5, wherein
the connection body connects the center bearing and the cross-member in a state in which the connection body is loosened to allow the backward movement of the center bearing.

7. The structure of claim 1, wherein
the propeller shaft has, at a position thereof on a rear side relative to the center bearing, a collapse structure in which the propeller shaft is compressed in an axial direction of the rear shaft.

8. The structure of claim 1, wherein
on a side opposite to the fuel tank relative to the center bearing, an exhaust pipe is provided so as to extend in the vehicle length direction, and
a connection part of the cross-member and the connection body is positioned between the exhaust pipe and the center bearing.

9. The structure of claim 1, wherein
the propeller shaft is arranged so as to pass below the cross-member,
the center bearing is arranged on a front side relative to the cross-member, and
the fuel tank includes a front extension extending toward the front side beyond the cross-member through below the cross-member and arranged next to the center bearing in a vehicle width direction.

* * * * *